(12) United States Patent
Adcock et al.

(10) Patent No.: US 7,765,137 B1
(45) Date of Patent: Jul. 27, 2010

(54) METHOD AND SYSTEM FOR MAINTAINING AN ORDER ON A SELECTED MARKET CENTER

(75) Inventors: Paul D. Adcock, Burr Ridge, IL (US); Michael A. Cormack, Evanston, IL (US); Thomas F. Haller, Longwood, FL (US); Robert A. Hill, LaGrange, IL (US); Roark F. Siko, Chicago, IL (US)

(73) Assignee: Archipelago Holdings, Inc., Chicago, IL (US)

( * ) Notice: Subject to any disclaimer, the term of this patent is extended or adjusted under 35 U.S.C. 154(b) by 679 days.

(21) Appl. No.: 11/122,689

(22) Filed: May 5, 2005

(51) Int. Cl.
*G06Q 40/00* (2006.01)
(52) U.S. Cl. .................... 705/35; 705/36 R; 705/37
(58) Field of Classification Search ............... 705/36 R, 705/37, 35
See application file for complete search history.

(56) References Cited

U.S. PATENT DOCUMENTS

| | | | |
|---|---|---|---|
| 5,101,353 A | 3/1992 | Lupien et al. | |
| 5,560,580 A | 10/1996 | Almoslino | |
| 5,845,266 A | 12/1998 | Lupien et al. | |
| 5,905,974 A | 5/1999 | Fraser et al. | |
| 5,950,176 A | 9/1999 | Keiser et al. | |
| 6,012,046 A * | 1/2000 | Lupien et al. | 705/36 R |
| 6,098,051 A * | 8/2000 | Lupien et al. | 705/36 R |
| 6,278,982 B1 | 8/2001 | Korhammer et al. | |
| 6,343,278 B1 | 1/2002 | Jain et al. | |
| 6,377,940 B2 | 4/2002 | Tilfors et al. | |
| 6,405,180 B2 * | 6/2002 | Tilfors et al. | 705/36 R |
| 6,408,282 B1 | 6/2002 | Buist | |
| 6,505,174 B1 | 1/2003 | Keiser et al. | |
| 6,615,188 B1 | 9/2003 | Breen et al. | |
| 6,618,707 B1 | 9/2003 | Gary | |
| 6,714,948 B1 | 3/2004 | Richards | |
| 6,829,589 B1 | 12/2004 | Saliba | |

(Continued)

FOREIGN PATENT DOCUMENTS

AU 2006/24483 2/2006

(Continued)

OTHER PUBLICATIONS

Merriam-Webster Dictionary, $9^{th}$ ed., 1983, Def. "automatic".*

(Continued)

*Primary Examiner*—Mary Cheung
*Assistant Examiner*—B. Joan Amelunxen
(74) *Attorney, Agent, or Firm*—Milbank, Tweed, Hadley & McCloy LLP

(57) ABSTRACT

A posting market center and process are disclosed for maintaining a market center-restricted order on a selected market center. The market center and process disclosed aggressively maintain a market center-restricted order that would normally lock or cross an away market by initially pricing the order a tick increment away from the contra side market best bid or offer and then dynamically re-pricing the order in increasing aggressiveness as the away market best bid or offer moves its quotes further away from the order's currently displayed price. The disclosed market center-restricted order stands its ground to an updated away market best bid or offer that moves to its price or through it.

32 Claims, 5 Drawing Sheets

U.S. PATENT DOCUMENTS

| | | |
|---|---|---|
| 6,832,210 B1 | 12/2004 | Li |
| 6,850,907 B2 | 2/2005 | Lutnick et al. |
| 6,963,856 B2 | 11/2005 | Lutnick et al. |
| 6,983,260 B2 | 1/2006 | Hummelgren |
| 7,162,448 B2 | 1/2007 | Madoff et al. |
| 7,184,982 B1 | 2/2007 | Howorka et al. |
| 7,197,483 B2 | 3/2007 | Brady et al. |
| 7,209,896 B1* | 4/2007 | Serkin et al. .................. 705/37 |
| 7,225,153 B2 | 5/2007 | Lange |
| 7,242,669 B2 | 7/2007 | Bundy et al. |
| 7,246,090 B1 | 7/2007 | Thomas |
| 7,246,093 B1 | 7/2007 | Katz |
| 7,249,086 B2 | 7/2007 | Bloom et al. |
| 7,356,498 B2 | 4/2008 | Kaminsky et al. |
| 7,383,220 B1 | 6/2008 | Keith |
| 7,401,046 B2 | 7/2008 | Hollerman et al. |
| 7,467,110 B2 | 12/2008 | Muller et al. |
| 2001/0037284 A1 | 11/2001 | Finkelstein et al. |
| 2002/0010672 A1 | 1/2002 | Waelbroeck et al. |
| 2002/0010673 A1 | 1/2002 | Muller et al. |
| 2002/0019795 A1 | 2/2002 | Madoff et al. |
| 2002/0019799 A1 | 2/2002 | Ginsberg et al. |
| 2002/0042765 A1 | 4/2002 | Dawson |
| 2002/0062273 A1 | 5/2002 | Perkel et al. |
| 2002/0082979 A1 | 6/2002 | Sands et al. |
| 2002/0091617 A1 | 7/2002 | Keith |
| 2002/0091621 A1 | 7/2002 | Conklin et al. |
| 2002/0128951 A1 | 9/2002 | Kiron et al. |
| 2002/0128955 A1 | 9/2002 | Brady et al. |
| 2002/0128958 A1 | 9/2002 | Slone |
| 2002/0143676 A1 | 10/2002 | Kiron et al. |
| 2002/0147670 A1 | 10/2002 | Lange |
| 2002/0161687 A1* | 10/2002 | Serkin et al. .................. 705/37 |
| 2002/0169703 A1 | 11/2002 | Lutnick et al. |
| 2002/0184135 A1 | 12/2002 | Zakaria |
| 2002/0184136 A1 | 12/2002 | Cleary et al. |
| 2002/0198815 A1 | 12/2002 | Greifeld et al. |
| 2002/0198816 A1 | 12/2002 | Gilbert et al. |
| 2003/0004851 A2 | 1/2003 | Kiron et al. |
| 2003/0004858 A1 | 1/2003 | Schmitz et al. |
| 2003/0009400 A2 | 1/2003 | Kiron et al. |
| 2003/0009412 A1 | 1/2003 | Furbush et al. |
| 2003/0009413 A1 | 1/2003 | Furbush et al. |
| 2003/0009414 A1 | 1/2003 | Furbush et al. |
| 2003/0014351 A1 | 1/2003 | Neff et al. |
| 2003/0023536 A1 | 1/2003 | Hollerman et al. |
| 2003/0040955 A1 | 2/2003 | Anaya et al. |
| 2003/0041006 A1 | 2/2003 | Bunda |
| 2003/0093343 A1 | 5/2003 | Huttenlocher et al. |
| 2003/0097328 A1 | 5/2003 | Lundberg et al. |
| 2003/0115131 A1 | 6/2003 | Heaton et al. |
| 2003/0130920 A1 | 7/2003 | Freund et al. |
| 2003/0130925 A1 | 7/2003 | Malitzis |
| 2003/0130926 A1 | 7/2003 | Moore |
| 2003/0135443 A1 | 7/2003 | Moore et al. |
| 2003/0139998 A1 | 7/2003 | Gilbert et al. |
| 2003/0172024 A1 | 9/2003 | Kokis et al. |
| 2003/0177082 A1 | 9/2003 | Buckwalter |
| 2003/0191703 A1 | 10/2003 | Chen et al. |
| 2003/0216932 A1 | 11/2003 | Foley |
| 2003/0229557 A1 | 12/2003 | Richmann et al. |
| 2003/0233307 A1 | 12/2003 | Salvadori et al. |
| 2004/0030630 A1* | 2/2004 | Tilfors et al. .................. 705/37 |
| 2004/0044610 A1 | 3/2004 | Fraser et al. |
| 2004/0059666 A1 | 3/2004 | Waelbroeck et al. |
| 2004/0088242 A1 | 5/2004 | Ascher et al. |
| 2004/0143538 A1 | 7/2004 | Korhammer et al. |
| 2004/0143542 A1 | 7/2004 | Macgill et al. |
| 2004/1043542 | 7/2004 | Macgill et al. |
| 2004/0177024 A1 | 9/2004 | Bok et al. |
| 2004/0177026 A1 | 9/2004 | Baladbon |
| 2004/0210508 A1 | 10/2004 | Bohnenberger |
| 2004/0210511 A1 | 10/2004 | Waelbroeck et al. |
| 2004/0215538 A1 | 10/2004 | Smith et al. |
| 2004/0225592 A1 | 11/2004 | Churquina |
| 2004/0236662 A1 | 11/2004 | Korhammer et al. |
| 2004/0236669 A1 | 11/2004 | Horst et al. |
| 2004/0243502 A1 | 12/2004 | Slowik et al. |
| 2004/0254804 A1 | 12/2004 | Peterffy et al. |
| 2004/0254877 A1 | 12/2004 | Buckwalter et al. |
| 2004/0267655 A1 | 12/2004 | Davidowitz et al. |
| 2005/0010481 A1 | 1/2005 | Lutnick et al. |
| 2005/0075963 A1 | 4/2005 | Balabon |
| 2005/0096999 A1 | 5/2005 | Newell et al. |
| 2005/0119964 A1 | 6/2005 | Brady et al. |
| 2005/0125316 A1 | 6/2005 | Levering et al. |
| 2005/0137962 A1* | 6/2005 | Penney et al. .................. 705/37 |
| 2005/0160024 A1 | 7/2005 | Soderborg et al. |
| 2005/0171887 A1* | 8/2005 | Daley et al. .................. 705/37 |
| 2005/0171888 A1* | 8/2005 | Daley et al. .................. 705/37 |
| 2005/0171889 A1* | 8/2005 | Daley et al. .................. 705/37 |
| 2005/0171890 A1* | 8/2005 | Daley et al. .................. 705/37 |
| 2005/0171891 A1* | 8/2005 | Daley et al. .................. 705/37 |
| 2005/0171895 A1 | 8/2005 | Howorka et al. |
| 2005/0197916 A1 | 9/2005 | Newell et al. |
| 2005/0222936 A1* | 10/2005 | Panariti et al. .................. 705/37 |
| 2005/0228739 A1 | 10/2005 | Leibowitz |
| 2005/0240510 A1 | 10/2005 | Schweichert et al. |
| 2005/0273407 A1 | 12/2005 | Black |
| 2005/0273408 A1 | 12/2005 | Bandman et al. |
| 2005/0273419 A1 | 12/2005 | Ogg et al. |
| 2005/0283415 A1 | 12/2005 | Studnitzer et al. |
| 2005/0283421 A1 | 12/2005 | Hatheway et al. |
| 2005/0283426 A1 | 12/2005 | Krishnasami et al. |
| 2005/0283427 A1 | 12/2005 | Owens et al. |
| 2006/0020536 A1 | 1/2006 | Renton et al. |
| 2006/0031157 A1 | 2/2006 | Gianakouros et al. |
| 2006/0089898 A1 | 4/2006 | Durkin et al. |
| 2006/0089899 A1 | 4/2006 | Durkin et al. |
| 2006/0136318 A1 | 6/2006 | Rafieyan et al. |
| 2006/0136326 A1 | 6/2006 | Heckman et al. |
| 2006/0149659 A1 | 7/2006 | Carone et al. |
| 2006/0161494 A1 | 7/2006 | Littlewood |
| 2006/0184444 A1 | 8/2006 | McConaughy et al. |
| 2006/0206404 A1 | 9/2006 | Hatheway et al. |
| 2006/0206407 A1 | 9/2006 | Troxel et al. |
| 2006/0235786 A1 | 10/2006 | DiSalvo |
| 2006/0253374 A1 | 11/2006 | Addock et al. |
| 2006/0259391 A1 | 11/2006 | Schoen et al. |
| 2006/0277137 A1 | 12/2006 | Claus et al. |
| 2006/0277138 A1 | 12/2006 | Ross et al. |
| 2007/0022041 A1 | 1/2007 | Durkin et al. |
| 2007/0043647 A1 | 2/2007 | Bickford |
| 2007/0055607 A1 | 3/2007 | Wunsch et al. |
| 2007/0078753 A1 | 4/2007 | Cormack et al. |
| 2007/0112693 A1 | 5/2007 | Cushing |
| 2007/0198391 A1 | 8/2007 | Dreyer et al. |
| 2007/0244792 A1 | 10/2007 | Couperier et al. |
| 2008/0040290 A1 | 2/2008 | Harris |

FOREIGN PATENT DOCUMENTS

| | | |
|---|---|---|
| AU | 2006/244479 | 11/2006 |
| AU | 2006/244499 | 11/2006 |
| AU | 2006/244562 | 11/2006 |
| AU | 2006/244563 | 11/2006 |
| AU | 2006/244564 | 11/2006 |
| AU | 2006/244566 | 11/2006 |
| EP | 1 321 870 | 6/2003 |
| JP | 2008/510109 | 4/2008 |
| JP | 2008/510226 | 4/2008 |
| JP | 2008/510238 | 4/2008 |
| JP | 2008/510110 | 11/2008 |
| SG | 2007/166754 | 7/2007 |

| | | |
|---|---|---|
| SG | 2007/166762 | 7/2007 |
| SG | 2007/166770 | 7/2007 |
| SG | 2007/166788 | 7/2007 |
| SG | 2007/166796 | 7/2007 |
| SG | 2007/166804 | 7/2007 |
| SG | 2007/166812 | 7/2007 |
| WO | WO 01/07039 | 2/2001 |
| WO | WO 01/09008 | 2/2001 |
| WO | WO 01/22322 | 3/2001 |
| WO | WO 01/22339 | 3/2001 |
| WO | WO 01/52166 | 7/2001 |
| WO | WO 01/75733 | 10/2001 |
| WO | WO 01/90925 | 11/2001 |
| WO | WO 2004/008296 | 1/2004 |
| WO | WO 2005/010790 | 2/2005 |
| WO | WO 2005/036354 | 4/2005 |
| WO | PCTUS2006016683 | 1/2006 |
| WO | PCTUS2006016684 | 1/2006 |
| WO | PCTUS2006016685 | 1/2006 |
| WO | PCTUS2006016701 | 1/2006 |
| WO | PCTUS2006017249 | 1/2006 |
| WO | PCTUS2006017253 | 1/2006 |
| WO | PCTUS2006017296 | 1/2006 |
| WO | PCTUS2006036461 | 1/2006 |
| WO | PCTUS2006036878 | 2/2006 |
| WO | PCTUS2007016571 | 1/2007 |
| WO | PCTUS2007016572 | 1/2007 |
| WO | PCTUS2007016682 | 1/2007 |
| WO | PCTUS2007016718 | 1/2007 |
| WO | PCTUS2007016856 | 1/2007 |
| WO | PCTUS2007016857 | 1/2007 |
| WO | PCTUS2007024921 | 2/2007 |

OTHER PUBLICATIONS

Roger D. Huang et al., Tick Size, Bid-Ask Spreads and Market Structure, Working Paper 99-05, Version: Feb. 8, 2001; Forthcoming Journal of Financial & Quantitative Analysis. pp. 1-29.*
Bart Frijns et al., Price discovery in tick time, Journal of Empirical Financial, vol. 16, Issue 5, Dec. 2009, pp. 759-776.*
U.S. Appl. No. 61/191,055, filed Oct. 2008.
U.S. Appl. No. 11/881,788, filed Jul. 2007.
U.S. Appl. No. 11/881,789, filed Jul. 2007.
U.S. Appl. No. 11/881,064, filed Jul. 2007.
U.S. Appl. No. 11/880,852, filed Jul. 2007.
U.S. Appl. No. 11/880,686, filed Jul. 2007.
U.S. Appl. No. 11/880,840, filed Jul. 2007.
U.S. Appl. No. 11/634,020, filed Dec. 2006.
U.S. Appl. No. 11/527,797, filed Sep. 2006.
U.S. Appl. No. 11/416,710, filed May 2006.
U.S. Appl. No. 11/416,913, filed May 2006.
U.S. Appl. No. 11/416,756, filed May 2006.
U.S. Appl. No. 11/416,943, filed May 2006.
U.S. Appl. No. 11/416,942, filed May 2006.
U.S. Appl. No. 11/525,363, filed Sep. 2006.
U.S. Appl. No. 11/345,421, filed Jan. 2006.
U.S. Appl. No. 11/122,498, filed May 2005.
U.S. Appl. No. 60/721,165, filed Sep. 2005.
U.S. Appl. No. 11/122,679, filed May 2005.
U.S. Appl. No. 11/345,420, filed Jan. 2006.
International Search Report & Written Opinion, PCT/US07/16856, Nov. 10, 2008.
International Search Report for PCT/US06/16685, Sep. 17, 2007.
International Preliminary Report on Patentability, PCT/US2007/016572, Apr. 23, 2009.
International Preliminary Report on Patentability, PCT/US2007/024921, Jun. 18, 2009.
McKinnion, Julie M., Toldeo Ohio-Based Dana Corp. Could Lose NYSE Listing in Takeover Battle, The Blade, Aug. 3, 2003.
Young, Lee, W., International Search Report May 18, 2007, 4 pages.
Young, Lee, W., International Search Report Sep. 12, 2007, 6 pages.
Young, Lee, W., International Search Report Aug. 9, 2007, 6 pages.
Young, Lee, W., International Search Report Aug. 29, 2007, 7 pages.
Young, Lee, W., International Search Report Sep. 5, 2007, 8 pages.
Young, Lee, W., International Search Report Sep. 7, 2007, 5 pages.
Young, Lee, W., International Search Report Sep. 29, 2007, 6 pages.
Australian Patent Office Written Opinion & Search Report, mailed Dec. 1, 2008.
Australian Patent Office Written Opinion & Search Report, mailed Jan. 9, 2009.
Australian Patent Office Written Opinion & Search Report, mailed Feb. 13, 2009.
Austrian Patent Office Search Report and Written Opinion, mailed Mar. 6, 2009.
Austrian Patent Office Search Report and Written Opinion, mailed Mar. 13, 2009.
Notice of Allowance and Examiner's Amendment for U.S. Appl. No. 11/345,420.
PhlX Allows Floor Broker Crossing, Wall Street Letter, New York, Feb. 24, 2003, p. 1.
Anonymous, Rising tide lifts all boats in institutional equities, The Investment Dealers' digest: IDD, New York, Mar. 28, 1994, vol. 60, Iss. 13, p. 16, 5 pages.
Headstrong Buys assets of Elind Software Provider; Noticiasfinancieras, Miami Nov. 1, 2004, p. 1.
International Search Report, Mar. 20, 2008 for PCT/US2007/016718.
International Search Report, Jun. 17, 2008 for PCT/US2007/016682.
International Search Report, Sep. 18, 2008 for PCT/US2007/016856.
International Search Report, Nov. 10, 2008 for PCT/US2007/016856.
International Search Report, Sep. 5, 2008 for PCT/US2007/016857.
International Search Report, Jul. 2, 2008 for PCT/US2007/016572.
Non-Final Rejection, Apr. 1, 2008 for U.S. Appl. No. 11/122,679.
Response to Non-Final, Oct. 6, 2008 for U.S. Appl. No. 11/122,679.
Non-Final Rejection, Jan. 5, 2009 for U.S. Appl. No. 11/122,679.
Response to Non-Final, Apr. 6, 2009 for U.S. Appl. No. 11/122,679.
Examiner Interview, May 4, 2009 for U.S. Appl. No. 11/122,679.
Response to Non-Final, Jun. 17, 2009 for U.S. Appl. No. 11/122,679.
Non-Final Rejection, Dec. 9, 2008 for U.S. Appl. No. 11/345,420.
Response to Non-Final, Mar. 16, 2009 for U.S. Appl. No. 11/345,420.
Notice of Allowance, Jul. 23, 2009 for U.S. Appl. No. 11/345,420.
Non-Final Rejection, Feb. 12, 2008 for U.S. Appl. No. 11/122,498.
Response to Non-Final, Aug. 14, 2008 for U.S. Appl. No. 11/122,498.
Final Rejection, Sep. 19, 2008 for U.S. Appl. No. 11/122,498.
Response to Final, Jan. 9, 2009 for U.S. Appl. No. 11/122,498.
Non-Final Rejection, Apr. 15, 2009 for U.S. Appl. No. 11/122,498.
Non-Final Rejection, Jun. 27, 2008 for U.S. Appl. No. 11/345,421.
Response to Non-Final, Sep. 22, 2008 for U.S. Appl. No. 11/345,421.
Final Rejection, Jan. 26, 2009 for U.S. Appl. No. 11/345,421.
Response to Final, May 22, 2009 for U.S. Appl. No. 11/345,421.
Non-Final Rejection, Sep. 30, 2008 for U.S. Appl. No. 11/416,942.
Response to Non-Final, Jan. 12, 2009 for U.S. Appl. No. 11/416,942.
Final Rejection, Apr. 23, 2009 for U.S. Appl. No. 11/416,942.
Non-Final Rejection, Apr. 4, 2008 for U.S. Appl. No. 11/416,710.
Informal Response to Non-Final, Aug. 4, 2008 for U.S. Appl. No. 11/416,710.
Notice to Applicant re: Informal Response to Non-Final, Sep. 11, 2008 for U.S. Appl. No. 11/416,710.
Response to Non-Final, Sep. 19, 2008 for U.S. Appl. No. 11/416,710.
Non-Final Rejection, Dec. 30, 2008 for U.S. Appl. No. 11/416,710.
Response to Non-Final, Mar. 27, 2009 for U.S. Appl. No. 11/416,710.
Non-Final Rejection, Dec. 29, 2008 for U.S. Appl. No. 11/416,913.
Response to Non-Final, Mar. 25, 2009 for U.S. Appl. No. 11/416,913.
Final Rejection, Aug. 3, 2009 for U.S. Appl. No. 11/416,913.
Restriction Requirement, Mar. 27, 2009 for U.S. Appl. No. 11/416,756.
Response to Non-Final, Apr. 27, 2009 for U.S. Appl. No. 11/416,756.
Non-Final Rejection, Aug. 4, 2009 for U.S. Appl. No. 11/416,756.
Non-Final Rejection, Sep. 3, 2008 for U.S. Appl. No. 11/416,943.
Response to Non-Final, Dec. 5, 2008 for U.S. Appl. No. 11/416,943.
Final Rejection, Mar. 17, 2009 for U.S. Appl. No. 11/416,943.
Response to Final, Jun. 17, 2009 for U.S. Appl. No. 11/416,943.
Non-Final Rejection, May 19, 2009 for U.S. Appl. No. 11/525,363.
International Search Report, Jun. 17, 2008 for PCT/US2006/036461.

Non-Final Rejection, Sep. 15, 2008 for U.S. Appl. No. 11/527,797.
Response to Non-Final, Dec. 15, 2008 for U.S. Appl. No. 11/527,797.
Final Rejection, Mar. 30, 2009 for U.S. Appl. No. 11/527,797.
Response to Final, May 19, 2009 for U.S. Appl. No. 11/527,797.
Non-Final Rejection, Nov. 12, 2008 for U.S. Appl. No. 11/634,020.
Response to Non-Final, Feb. 17, 2009 for U.S. Appl. No. 11/634,020.
Non-Final Rejection, Jun. 24, 2009 for U.S. Appl. No. 11/634,020.
International Search Report, May 12, 2008 for PCT/US2007/024921.
International Search Report, Jun. 17, 2008 for PCT/US2007/016571.
Examiner Interview Summary Record, Sep. 9, 2009 for U.S. Appl. No. 11/122,679.
Notice of Allowance, Aug. 21, 2009 for U.S. Appl. No. 11/122,679.
Response to Nonfinal, Sep. 15, 2009 for U.S. Appl. No. 11/122,498.
Examiner Interview Summary Record, Aug. 18, 2009 for U.S. Appl. No. 11/122,498.
Examiner Interview Summary Record, Mar. 31, 2009 for U.S. Appl. No. 11/416,943.
Examiner Interview Summary Record, Sep. 9, 2009 for U.S. Appl. No. 11/416,943.
Response to Non-final, Sep. 23, 2009 for U.S. Appl. No. 11/634,020.
Response to Final, Sep. 30, 2009 for U.S. Appl. No. 11/416,942.
Nonfinal Rejection, Sep. 30, 2009 for U.S. Appl. No. 11/416,943.
NASDAQ Launches Liquidity Tracker, HighBeam Research, Dec. 5, 2002.
Response to Nonfinal, Sep. 29, 2009 for U.S. Appl. No. 11/634,020.
Response to Final, Oct. 19, 2009 for U.S. Appl. No. 11/416,913.
International Search Report, Oct. 14, 2009 for SG2007166754.
International Search Report, Oct. 2, 2009 for SG2007166812.
Nonfinal Rejection, Aug. 17, 2009 for U.S. Appl. No. 11/416,710.
Response to Nonfinal, Nov. 2, 2009 for U.S. Appl. No. 11/416,710.
Response to Final, Oct. 7, 2009 for U.S. Appl. No. 11/416,942.
Examiner Interview Summary, Oct. 14, 2009 for U.S. Appl. No. 11/416,942.
Nonfinal Rejection, Oct. 7, 2009 for U.S. Appl. No. 11/345,421.
Response to Nonfinal, Nov. 6, 2009 for 416,756.
Response to Nonfinal, Nov. 23, 2009 for U.S. Appl. No. 11/345,421.
Response to Nonfinal, Nov. 16, 2009 for U.S. Appl. No. 11/525,363.
Nonfinal rejection, Aug. 12, 2009 for U.S. Appl. No. 11/527,797.
Response to Final, Nov. 17, 2009 for U.S. Appl. No. 11/527,797.
Nonfinal Rejection, Nov. 6, 2009 for U.S. Appl. No. 11/880,686.
A Taxonomy of Automated Trade Execution Systems, Ian Domowitz, Journal of International Money and Finance, (1993), 12, pp. 607-631.
Final Rejection, Dec. 28, 2009 for U.S. Appl. No. 11/634,020.
Response to Nonfinal, Oct. 14, 2009 for U.S. Appl. No. 11/416,943.
Notice of Allowance, Dec. 29, 2009 for U.S. Appl. No. 11/416,942.
Notice of Allowance, Nov. 16, 2009 for U.S. Appl. No. 11/345,420.
Tseng, K.C., Supermontage as a New Trading System of NASDAQ, Investment Management and Financial Innovations, Mar. 2005.
Schnitzlein, Charles R., Call and Continuous Trading Mechanisms Under Asymmetric Information: An Experimental Investigation, the Journal of Finance, vol. 51, No. 2, Jun. 1996.
Jan. 15, 2010 Notice of Allowance for U.S. Appl. No. 11/122,679.
Jan. 15, 2010 Notice of Allowability for U.S. Appl. No. 11/122,679.
Jan. 21, 2010 Examiner Interview for U.S. Appl. No. 11/122,498.
Jan. 21, 2010 Final Rejection for U.S. Appl. No. 11/122,498.
Jan. 22, 2010 Nonfinal Rejection for U.S. Appl. No. 11/416,913.
Jan. 26, 2010 Final Rejection for U.S. Appl. No. 11/527,797.
Jan. 26, 2010 Notice of Allowance for U.S. Appl. No. 11/416,942.

* cited by examiner

METHOD AND SYSTEM FOR MAINTAINING AN ORDER ON A SELECTED MARKET CENTER

BACKGROUND

Regulations and established rules dictate how financial instrument market centers, including securities market centers, must interact with one another and, specifically, how orders are to be handled among market centers. Some present market center rules and regulations for some markets dictate that when an order is placed on a market center, it is to be executed at the best bid or offer price presently available in the entire market ("Market Best Bid" or "Market Best Offer"), regardless of whether the market center that the order was sent to is presently offering the best bid or best offer price. If a market center receives an incoming marketable order (i.e. an order whose price is at or better than the opposite side Market Best Bid or Best Offer price) and cannot match that order within its own order book, then that market center must route all or part of the order to the market center then presently posting the Market Best Bid or Best Offer price.

While these rules and regulations are designed to give a securities trader the benefit of having his order executed at the best price available in the market at the time, traders sometimes want their orders only executed on the market center to which they sent the order, trading off speed of execution versus best price. These traders do not want their orders to leave the market center to which it was sent. Traders can make this request as long as their order does not lock or cross the away market. A trader's order would lock the away market if the trader's order price has the same price as the Market Best Bid or Best Offer price then available on the opposing side of the market (i.e. the trader's buy order price is equal to the Market Best Offer price or the trader's sell price is equal to the Market Best Bid price). A trader's order price would cross the away market if a trader's buy order price is higher than the Market Best Offer price or if a trader's sell order price is lower than the Market Best Bid price.

In prior systems, if a trader's market center-restricted order locked or crossed the away market, it was typically canceled. Traders in such systems typically had to choose between pricing an order aggressively to maximize trading opportunities or risk having the order cancelled because the trader had priced it through the market (i.e. priced it so that it would lock or cross the away market).

Accordingly, there is a need for a market center order processing method and system where a trader can designate that an order only execute on a specific market center and that order will only re-price more aggressively than its current posted price and not fade from its current posted price as prices on an away market move to or through it.

SUMMARY

According to an aspect of the present invention, a method for processing an incoming market center-restricted order includes providing a posting market center having a public order book and providing a tick back increment. It further includes receiving a market center-restricted order specifying a financial instrument and a price and retrieving an away market best price in the specified financial instrument. It further includes determining whether the price of the market center-restricted order locks or crosses the best away market price, such that when the price of the market restricted order locks or crosses the best away market price, a ticked back price parameter is computed based on the away market best price and the tick back increment and where the computed ticked back price parameter is displayed as the market center-restricted order price on the posting market center public order book. The method further includes retrieving an updated away market best price, where the updated away market best price has moved to or through the price displayed for the market center-restricted order such that the updated away market best price locks or crosses the posting market center public order book and maintaining the price displayed for the market center-restricted order in the posting market center public order book.

DESCRIPTION OF THE DRAWINGS

These and other features, aspects and advantages of the present invention will become better understood with regard to the following description, appended claims and accompanying drawings where:

DETAILED DESCRIPTION

Figure 1:
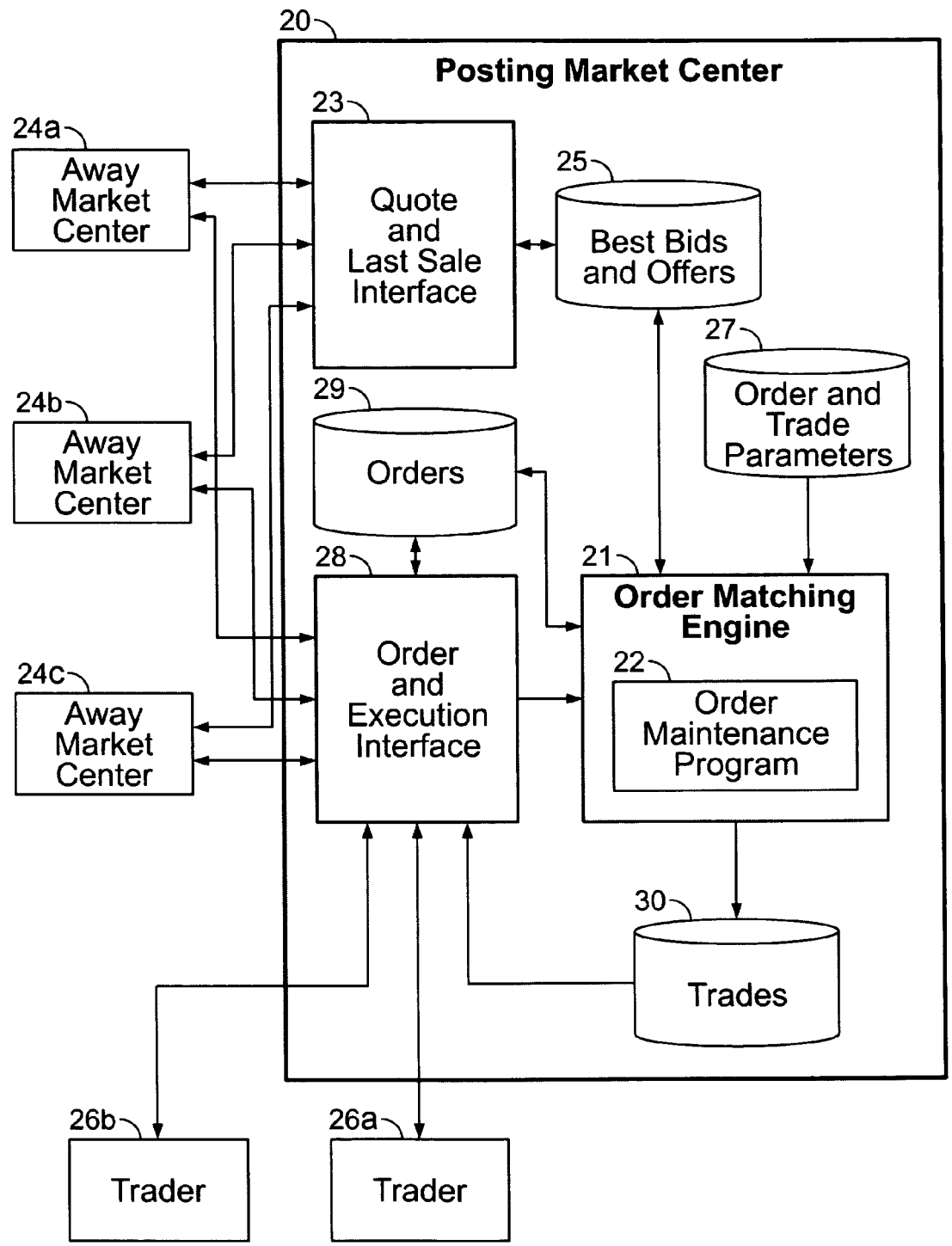
FIG. 1 is a block diagram illustrating the trading environment in which an embodiment of the present invention operates.

Referring to FIG. 1, a trading environment in which an embodiment of the system and method of the present invention operates is depicted. The examples discussed herein describe the use and application of the present invention in an equity security market center environment, but it should be understood that the present invention could be used in any type of financial instrument market center environment (e.g., securities, futures contracts, options, bonds, etc.). The trading environment of this embodiment includes a posting market center 20 which interacts with a number of other market centers 24 (i.e. away market centers) and traders 26. It should be understood that the posting market center 20 referred to herein refers to a computing system having sufficient processing and memory capabilities and does not refer to a specific physical location. In fact, in certain embodiments, the computing system may be distributed over several physical locations. It should also be understood that any number of traders 26 or away market centers 24 can interact with the posting market center 20. The posting market center 20 is the market center on which a specific trader 26 posts a specific order. The posting market center 20 includes an order matching engine 21, which validates, matches and processes all orders on the market center 20. In this embodiment, the order matching engine 21 includes an order maintenance program 22, which functions to aggressively maintain a market center-restricted order that would normally lock or cross an away market by dynamically re-pricing the order in view of the away market best bid or offer. The order maintenance program 22 may also be utilized as stand alone code separate and apart from the order matching engine 21. In this embodiment, the code for the order matching engine 21 and for the order maintenance program 22 are stored in the posting market center's memory.

The posting market center 20 may also include a quote and last sale interface 23 that interacts with the away market centers 24 to capture quote and last sale information. This information is stored to a best bids and offers data structure 25. This data structure 25 is where the Market Best Bid and Offer information is stored. The posting market center 20 may also include an order and trade parameters data structure 27. The order and trade parameters data structure 27 stores predefined trading parameters and rules that are used by the order matching engine 21 in matching orders and executing trades. The posting market center 20 may also include an order and execution interface 28 which interacts with the traders 26, the away market centers 24 and the order matching engine 21 in the order execution process. The posting market center 20 may also include an order information data structure 29 where order information is stored and a trade information data structure 30 where completed trade information is stored.

Throughout the discussion herein, it should be understood that the details regarding the operating environment, data structures, and other technological elements surrounding the posting market center 20 are by way of example and that the present invention may be implemented in various differing forms. For example, the data structures referred to herein may be implemented using any appropriate structure, data storage, or retrieval methodology (e.g., local or remote data storage in data bases, tables, internal arrays, etc.). Furthermore, a market center of the type described herein may support any type of suitable interface on any suitable computer system.

Incoming Market Center-Restricted Buy Order

Figure 2:
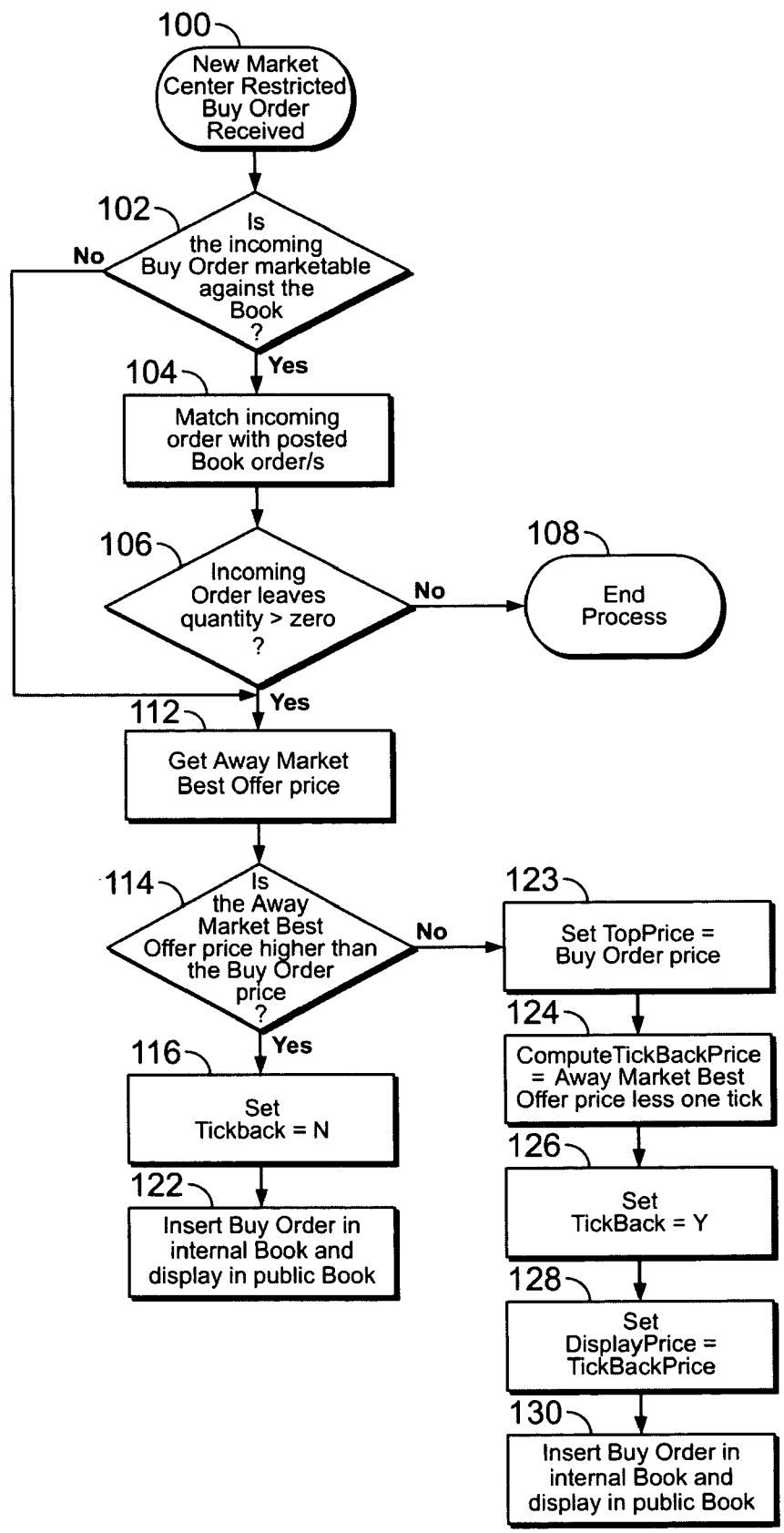
FIG. 2 is a flow diagram illustrating a process implemented by an embodiment of the present invention for incoming market center-restricted buy orders.

FIG. 2 illustrates the process implemented by the order maintenance program 22 where a trader 26 sends a buy order to the posting market center 20 with instructions that the buy order only be executed on the posting market center 20 (i.e. a market center-restricted buy order). At step 100, a new market center-restricted buy order is received by the order matching engine 21, and the order matching engine 21, recognizing the market center restriction, initiates the order maintenance program 22. At step 102, the process implemented by the order maintenance program 22 checks to see if the buy order is marketable against the posting market center's order book. If the buy order is marketable, the process proceeds to step 104 where the order matching engine 21 trades the new buy order against standing orders posted in the posting market center's order book according to the market center's trading rules. Then, at step 106, the process checks to see if the buy order still has any quantity remaining on the order to be traded. If the buy order does not, then the order is complete, and the process ends with respect to this order, as indicated at 108. If the order is not complete and still has quantity remaining to be traded, the process proceeds to step 112. Referring back to step 102, if the incoming buy order is not marketable, the process proceeds to step 112 at this point as well.

At step 112, the process retrieves the away market best offer price from data structure 25. At step 114, the away market best offer price is checked to see if it is higher than the buy order price. If the away market best offer price is higher than the buy order price, then the restricted buy order will not lock or cross the away market. The process proceeds to step 116 where a parameter, in this example named TickBack, is set to "N". Setting TickBack equal to "N" means that the process, as indicated at step 122, inserts the buy order in the posting market center's internal book and displays it on the public order book according to normal price/time priority rules for limit orders because the buy order does not lock or cross the away market.

Referring back to step 114, if the process determines that away market best offer price is not higher than the buy order price (i.e. the away market best offer price is equal to or less than the buy order price), then the posting of this order on the posting market center 20 would lock or cross the away market. The process, in this instance, acts to protect the away market centers 24 while not canceling the order, as would have been done with prior systems. The process proceeds to step 123 where the process sets the "Top Price" parameter equal to the price set in the incoming buy order. The Top Price parameter sets the highest possible price that the process will possibly set the order at when pegging it to the away market best offer price. Next, at step 124, the process computes a tick back price parameter ("Tick Back Price"). The tick back price parameter in this embodiment is equal to the away market best offer price minus one trade increment (i.e. a tick). At step 126, the process sets the tick back parameter ("Tick Back") to "Y" so the system knows for later checks that the order price has been ticked back. At step 128, the process sets a display price parameter ("Display Price") equal to the Tick Back Price parameter, and at step 130, the order is inserted into the posting market center's internal order book and displayed on the public order book according to the price/time priority rules applying to the Display Price parameter, not according to the order's original higher price (i.e. the Top Price).

EXAMPLE 1

Incoming Market Center-Restricted Buy Order
(Away Market Center at Best Offer Price)

An example of a new restricted buy order sent to a posting market center 20 is provided below. It should be understood that the order prices and market prices discussed in this example are by way of example only to illustrate how the process of an embodiment of the invention handles a market center-restricted buy order in a trading environment without a price exemption (i.e. in a trading environment where market best bids and best offers are respected such that orders on one market center are not allowed to trade through an away market center if the away market center is displaying the market best bid or market best offer).

In this example, the Market Best Bid is $19.95 and the Market Best Offer is $20.00. An Away Market Center A is quoting 800 @ $19.95 to 300 @ $20.00. The posting market center 20 has a limit sell order for 300 @ $20.01 in the market (Order X). The posting market center internal book in this example appears as follows:

| Bids | Offers |
| --- | --- |
| Away Market Center A 800 @ 19.95 | Away Market Center A 300 @ 20.00 |
| | Order X: 300 @ 20.01 |

The posting market center 20 receives the three incoming market center-restricted buy orders stated below in the following sequence and processes each order in accordance with the process of FIG. 2.

Order A: Buy 200 @ $19.99 (lower than the Market Best Offer price)

Order B: Buy 600 @ $20.00 (same as the Market Best Offer price)

Order C: Buy 700 @ $20.03 (higher than the Market Best Offer price)

Order A:

For Order A, the market center receives Order A at step 100. At step 102, the process assesses Order A's marketability against the posting market center's order book. In this case, Order A is not marketable because Order A is priced at $19.99, and this is lower than any offers presently posted on the posting market center 20. Accordingly, the process proceeds to step 112 where the process gets the away market best offer price from the data structure 25, which in this example is $20. At step 114, the process checks whether the away market best offer price is higher than Order A's buy order price. In this case, the away market best offer price ($20) is higher than Order A's restricted buy order price ($19.99), so the process continues on to step 116, setting the TickBack parameter to "N" since Order A's price does not need to be ticked back. At step 122, Order A is inserted into the posting market center's internal order book and is displayed on the public order book as an order to buy at $19.99.

Order B:

For Order B, the market center receives Order B at step 100. At step 102, the process assesses Order B's marketability against the posting market center's order book. In this case, as with Order A, Order B is not marketable. Even though Order B is priced at $20 and there is an offer in the market at $20, Order B is a restricted buy order and, as such, cannot execute against the offer at $20 on Away Market Center A. Accordingly, the process proceeds to step 112 where the process gets the away market best offer price of $20 in this example. At step 114, the process checks whether the away market best offer price is higher than Order B's buy order price. In this case, the away market best offer price ($20) is not higher than Order B's restricted buy order price ($20). They are equal. So, the process continues on to step 123, where the process sets the Top Price to $20 (i.e. Order B's buy order price). The process, then, at step 124, computes the tick back price parameter. In this example, the Tick Back Price parameter is $19.99 ($20-$0.01) (i.e. the away market best offer price minus one tick in this embodiment). It should be understood that "one tick" may be any trading increment (e.g., $0.01, $0.02, $0.03, etc.). A tick of $0.01 is used in this example for illustration purposes and in no way limits the scope of the present invention. At step 126, the process sets the Tick Back parameter to "Y" since Order B's price needs to be ticked back. At step 128, the process sets the Display Price parameter equal to the calculated Tick Back Price parameter. In this case, the Display Price parameter is set to $19.99. Then at step 130, Order B is inserted into the posting market center's internal order book, and the Display Price parameter of $19.99 is displayed on the public order book. However, the original price (i.e. the Top Price) of $20 is stored on the posting market center's internal book for reference for potential later re-pricing.

Order C:

For Order C, the market center receives Order C at step 100. At step 102, the process assesses Order C's marketability against the posting market center's order book. In this case, as with Orders A and B, Order C is not marketable. Accordingly, the process again proceeds to step 112 where the process gets the away market best offer of $20. At step 114, the process checks whether the away market best offer price is higher than Order C's buy order price. In this case, the away market best offer price ($20) is not higher than Order C's restricted buy order price ($20.03). As such, the process continues on to step 123, where the process sets the Top Price to $20.03 (i.e. Order C's buy order price). The process, then, at step 124, computes the tick back price parameter. In this example, as with Order B, the Tick Back Price parameter is $19.99 ($20-$0.01) (i.e. the away market best offer price minus one tick). At step 126, the process sets the Tick Back parameter to "Y" since Order C's price needs to be ticked back. At step 128, the process sets the Display Price parameter equal to the calculated Tick Back Price parameter. In this case, the Display Price parameter is set to $19.99. Then at step 130, Order C is inserted into the posting market center's internal order book, and the Display Price parameter of $19.99 is displayed on the public order book. However, the original price (i.e. the Top Price) of $20.03 is stored on the posting market center's internal book for reference for potential later re-pricing.

After processing Orders A, B and C in this example, the posting market center posts them to its internal book according to price/time priority rules. In this example, the stored parameters appear as follows:

| Bids | Offers |
|---|---|
| Order A: 200 @ 19.99, TickBack = N ← | Away Market Center A 300 @ 20.00 |
| Order B: 600 @ 19.99, TickBack = Y ← TopPrice = 20.00 | Order X: 300 @ 20.01 |
| Order C: 700 @ 19.99, TickBack = Y ← TopPrice = 20.03 | |
| Away Market Center A 800 @ 19.95 | |

In this example, at this point, the posting market center's best bid is 1500 @ $19.99 and the posting market center's best offer is 300 @ $20.01. The posting market center's public book looks like this:

| Bids | Offers |
|---|---|
| Posting Market Center 1500 @ 19.99 | Posting Market Center 300 @ 20.01 |

Figure 3:
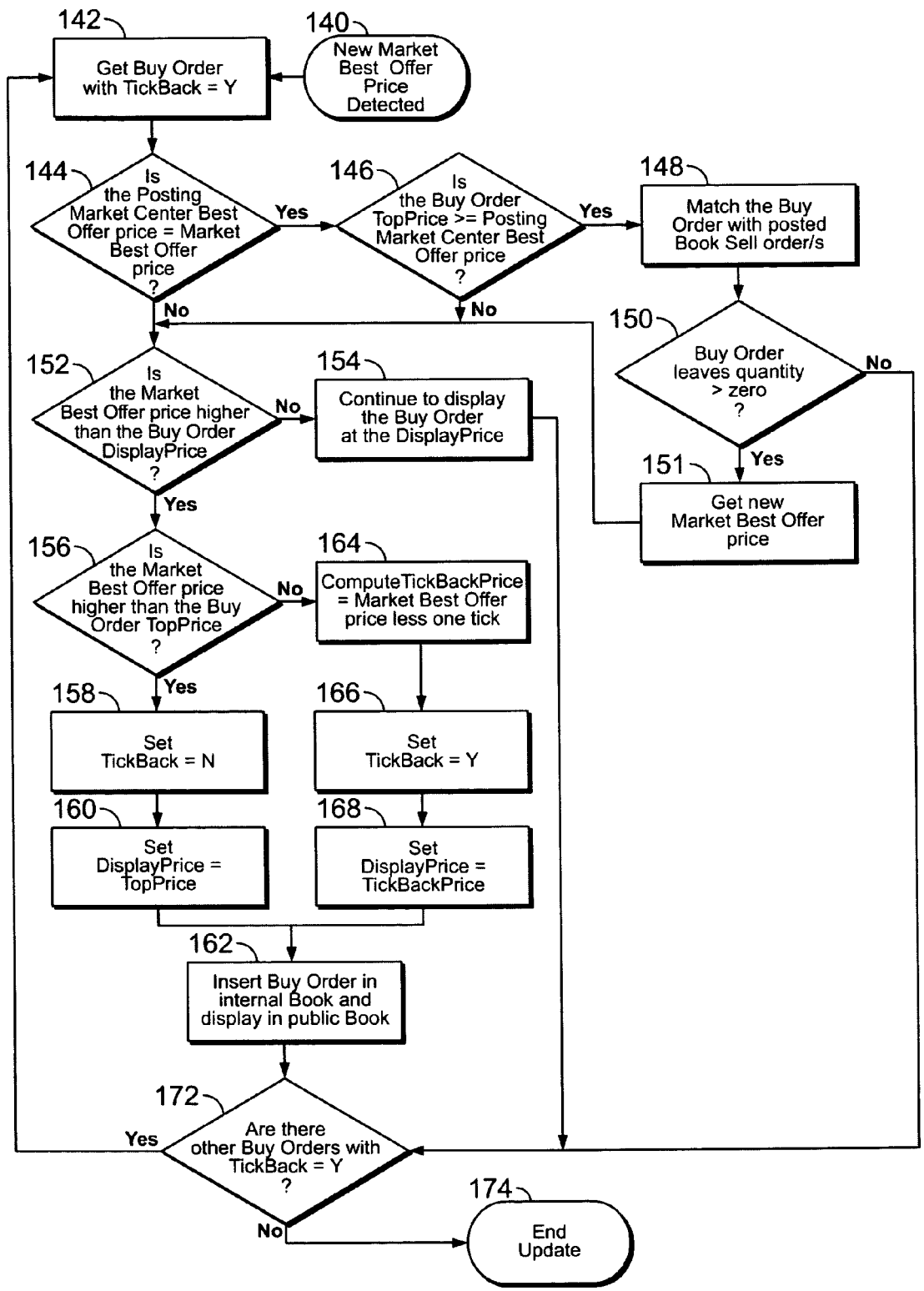
FIG. 3 is a flow diagram illustrating a process implemented by an embodiment of the present invention where ticked back buy orders are re-evaluated in view of an updated market best offer price.

Update of the Market Best Offer Price and Re-Evaluation of Ticked Back Market Center-Restricted Buy Orders Once the process has ticked back a market center-restricted buy order, such as Orders B and C in the example above, those orders must be checked and re-evaluated whenever the Market Best Offer price is updated. FIG. 3 illustrates the process implemented by the order maintenance program 22 where the Market Best Offer price is updated. The order matching engine 21 is continuously checking the best offer price for the entire market. At step 140, the order matching engine 21 detects a new Market Best Offer price and provides it to the order maintenance program 22. At step 142, the process implemented by the order maintenance program 22 retrieves a ticked back restricted buy order that has a "Tick Back" parameter equal to "Y". At step 144, the process checks if the posting market center's best offer price is equal to the Market Best Offer price (i.e. determining whether the posting market center 20 is at the Market Best Offer price). If the posting market center's best offer price is equal to the Market Best Offer price, then the process proceeds to step 146 where it checks whether the buy order's Top Price is greater than or equal to the posting market center's best offer price. If the buy order's Top Price is greater than or equal to the posting market center's best offer price, then at step 148, the process matches the buy order with the sell orders posted in the posting market center's book. Then, at step 150, the process checks to see if there is any quantity remaining on the buy order. If not, the process is complete for this order, and it checks to see if there are any further orders with a Tick Back parameter set to "Y", as indicated at step 172. If there is quantity remaining on the order, the process, at step 151, checks to see what the new Market Best Offer price is since the orders that put the posting market center 20 at the Market Best Offer price have now been exhausted. The process then proceeds to step 152. The process also proceeds to step 152 if the posting market center's best offer price is not equal to the Market Best Offer price (step 144) or if the buy order's Top Price is less than the posting market center's best offer price (step 146).

At step 152, the process checks if the updated Market Best Offer price is higher than the ticked back market center-restricted buy order's Display Price. If it is not, then, as indicated at step 154, the Display Price continues to be posted on the internal order book and displayed on the public order book. In this embodiment, the Display Price will continue to be displayed in the public order book even if, in light of a new away market best offer price, the Away Market Center now crosses or locks the Display Price of the ticked back order on the posting market center 20. Once a market center-restricted buy order of the present invention is posted, it will stand its ground to later updates of the Market Best Offer price that move to or through the displayed price, even if it results in an Away Market Center price crossing or locking a ticked back order. A market center-restricted buy order of the present invention differs from a traditional buy order that has been pegged to the offer (also known as a Market Peg) in this regard. A traditional pegged buy order moves with the price of the Market Best Offer price in both directions, up and down, even if the price of the Market Best Offer price moves to or through the displayed price of the pegged buy order. A buy order pegged to the Offer does not stand its ground to a Market Best Offer price that moves to or through it, causing the pegged buy order to be re-priced less aggressively. This is in contrast to a market center-restricted buy order of the present invention, which does stand its ground to a Market Best Offer price that moves to or through its displayed price. From step 154, the process proceeds to step 172 where it checks to see if there are any other buy orders with the Tick Back parameter set to "Y".

Referring back to step 152, if the updated Market Best Offer price is higher than the ticked back market center-restricted buy order's Display Price, then the process proceeds to step 156 where the process checks to see if the updated Market Best Offer price is higher than the buy order's Top Price. If the updated Market Best Offer price is now higher than the buy order's Top Price, then the buy order's original price would no longer lock or cross the market if displayed. As such, at step 158, the TickBack parameter for this order is set to "N", and this order is no longer a pegged order. At step 160, the Display Price for this order is set to the Top Price, and at step 162, the order is inserted into the posting market center's internal order book and displayed on the public order book according to the price/time priority rules applying to the Display Price parameter, which is now equal to the Top Price.

Referring back to step 156, if the updated Market Best Offer price is not higher than the buy order's Top Price, then at step 164, similar to when the order was displayed initially, the process computes a Tick Back Price parameter. As when the order was initially processed, the Tick Back Price parameter in this embodiment is equal to the Market Best Offer price minus one tick. At step 166, the process sets the Tick Back parameter to "Y" again. At step 168, the process sets the Display Price parameter equal to the updated Tick Back Price parameter, and at step 162, the order is inserted into the posting market center's internal order book and the Display Price is displayed on the public order book according to the price/time priority rules applying to the Display Price parameter, not according to the order's original higher price (i.e. the Top Price).

At step 172, the process checks to see if there are other buy orders with the Tick Back parameter set to "Y". If there are, then the process goes back to step 142 and analyzes this order in the same manner it analyzed the previous buy order, as described above. The process continues in this manner until there are no further buy orders with a Tick Back parameter set to "Y" to update, at which point the update is complete as indicated at step 174.

Examples of situations where the away market best offer price has been updated are provided below. It should be understood that the order prices and market prices discussed in these examples are by way of example only to illustrate how the process of an embodiment of the invention handles updating a ticked back market center-restricted buy order.

EXAMPLE 2

Update of the Market Best Offer Price and Re-Evaluation of Ticked Back Market Center-Restricted Buy Orders (Away Market Best Offer Price Moves Lower; Display Price of Restricted Buy Orders Stand their Ground)

In this Example 2, following through from Example 1, the Market Best Offer price has moved lower and has changed from $20 to $19.98. Away Market Center A is now quoting 800 @ $19.95 to 500 @ $19.98. Carrying through from Example 1 above, in the moment before processing and reevaluating the ticked back orders, the posting market center internal book appears as follows:

| Bids | Offers |
| --- | --- |
| Order A: 200 @ 19.99, TickBack = N ← | Away Market Center A 500 @ 19.98 |
| Order B: 600 @ 19.99, TickBack = Y ← TopPrice = 20.00 | Order X: 300 @ 20.01 |
| Order C: 700 @ 19.99, TickBack = Y ← TopPrice = 20.03 | |
| Away Market Center A 800 @ 19.95 | |

Orders B and C, since their Tick Back parameters are set to "Y", are processed in accordance with the process of FIG. 3 in light of the updated Market Best Offer price. Due to the similarity of processing in this example, Orders B and C are discussed together, but it should be understood that according to the price/time priority rules in effect that Order B is actually processed first. At step 142, the process retrieves the order to be analyzed (i.e. in this example, Order B first and then Order C). At step 144, the process checks to see if the updated posting market center's best offer price is equal to the Market Best Offer price. In this example, it is not. The process moves on to step 152 where the process determines whether the updated Market Best Offer price is higher than the orders' Display Price. In this example, the updated Market Best Offer price is not higher than Order B and C's Display Price. Away Market Center A's ask price is now lower than Order A, B and C's Display Price ($19.98<$19.99). Therefore, as step 154 indicates, the Display Price for Orders B and C does not change and is not re-priced. Since there are no further ticked back orders with a Tick Back parameter set to "Y", the update is complete.

Orders A, B and C stand their ground even though Away Market Center A has now crossed the posting market center's order book. In fact, because Orders A, B and C stand their ground, Away Market Center A, according to general marketplace rules applicable in this embodiment of the invention, is required to route an obligation to sell 1500 shares at $19.99 to the posting market center 20, the displayed size and price on the posting market center 20. Upon receipt, the posting market center 20 processes this obligation to trade with Orders A, B and C in the same manner it processes all other incoming away market trading obligations, by filling Orders A, B and C. If Away Market Center A does not satisfy its obligation to trade fully against Orders A, B and C, then the posting market center 20 follows its normal procedure of routing a request for satisfaction to Away Market Center A for any shares not filled.

EXAMPLE 3

Update of the Market Best Offer Price and Re-Evaluation of Ticked Back Market Center-Restricted Buy Orders (Posting Market Center at the Market Best Offer)

In this Example 3, following through from Example 1, the Market Best Offer price has moved higher and has changed from $20 to $20.01. The posting market center 20 now has the Market Best Offer (Order X), and Away Market Center A is now quoting 800 @ $19.95 to 400 @ $20.02. Carrying through from Example 1 above, the posting market center internal book in the moment before processing and reevaluating the ticked back orders appears as follows:

| Bids | Offers |
|---|---|
| Order A: 200 @ 19.99, TickBack = N ← | Order X: 300 @ 20.01 |
| Order B: 600 @ 19.99, TickBack = Y ← | Away Market Center A 400 |
| TopPrice = 20.00 | @ 20.02 |
| Order C: 700 @ 19.99, TickBack = Y ← | |
| TopPrice = 20.03 | |
| Away Market Center A 800 @ 19.95 | |

Orders B and C, since their Tick Back parameters are set to "Y", are processed in accordance with the process of FIG. 3 in light of the updated Market Best Offer price. In this embodiment, Order B is processed first based on price/time priority rules. At step 140, the market center 20 detects a new Market Best Offer price. At step 142, the process retrieves Order B, since Order B has a Tick Back parameter set to "Y". At step 144, the process checks to see if the posting market center's best offer price is equal to the Market Best Offer price. In this example, it is. The process moves on to step 146 where the process determines whether the buy order Top Price is greater than or equal to the posting market center's best offer price. Order B's Top Price ($20), in this example, is less than the posting market center's best offer price ($20.01), so the process proceeds to step 152. At step 152, the process determines whether the Market Best Offer price is higher than Order B's Display Price. In this example, the new Market Best Offer price ($20.01) is higher than Order B's Display Price ($19.99). The process proceeds to step 156 where it determines whether the Market Best Offer price is higher than Order B's Top Price. In this example, the new Market Best Offer price ($20.01) is higher than Order B's Top Price ($20). As such, at step 158, the process sets the Tick Back parameter to "N", and at step 160 Order B's Display Price is set to its Top Price since the new Market Best Offer is now higher than Order B's Top Price. Order B's Display Price is now set to Order B's original buy price of $20. Order B is no longer ticked back and will not be re-priced again. At step 162, the order is inserted into the posting market center's internal order book and displayed on the public order book according to the price time/priority rules applying to the new Display Price parameter, which is now Order B's original price. At step 172, the process checks for other Buy Orders that are ticked back. In this case, it finds Order C.

At step 142, the process retrieves Order C, since Order C has a Tick Back parameter set to "Y" and is next to be processed according to the price/time priority rules applicable in this example. The process then, at step 144, as before, determines whether the posting market center's best offer price is equal to the Market Best Offer price. In this example, it still is. Therefore, the process proceeds to step 146 where it determines whether the Order C's Top Price is greater than or equal to the posting market center's best offer price. Order C's Top Price ($20.03), in this example, is greater than the posting market center's best offer price ($20.01), so the process proceeds to step 148 where the process matches Order C against sell orders posted on the posting market center 20. In this example, 300 shares of Order C execute against Order X. At step 150, the process checks to see if Order C has any quantity remaining. In this instance, Order C does. It has 400 shares remaining. The process proceeds to step 151 where it gets the new Market Best Offer price. In this example, the new Market Best Offer price is $20.02 (i.e. the offer of 400 @ 20.02 on Away Market Center A). The process then proceeds to step 152.

At step 152, the process determines whether the Market Best Offer price is higher than Order C's Display Price. In this example, the new Market Best Offer price ($20.02) is higher than Order C's Display Price ($19.99). The process proceeds to step 156 where it determines whether the Market Best Offer price is higher than Order C's Top Price. In this example, the new Market Best Offer price ($20.02) is not higher than Order C's Top Price ($20.03). As such, at step 164, the process computes an updated tick back price parameter. In this example, the Tick Back Price parameter is $20.01 ($20.02-$0.01) (i.e. the away market best offer price minus one tick). At step 166, the process sets the Tick Back parameter to "Y" since Order C's price still needs to be ticked back. At step 168, the process sets the Display Price parameter equal to the calculated Tick Back Price parameter. In this case, the Display Price parameter is set to $20.01. Then at step 162, Order C is inserted into the posting market center's internal order book, and the Display Price parameter of $20.01 is displayed on the public order book. However, the original price (i.e. the Top Price) of $20.03 is still stored on the posting market center's internal book for reference for potential later re-pricing.

At step 172, the process checks to see if there are other buy orders with the Tick Back parameter set to "Y". There are no more in this example. So, the update is complete, as indicated at step 174.

After processing Orders B and C as explained above, the posting market center posts them to its internal book according to price/time priority rules. In this example, the stored parameters appear as follows:

| Bids | Offers |
|---|---|
| Order C: 400 @ 20.01, TickBack = Y ← | Away Market Center A 400 |
| TopPrice = 20.03 | @ 20.02 |
| Order B: 600 @ 20.00, TickBack = N ← | |
| TopPrice = 20.00 | |
| Order A: 200 @ 19.99, TickBack = N ← | |
| Away Market Center A 800 @ 19.95 | |

In this example, at this point, the posting market center's public book looks like this:

| Bids | Offers |
|---|---|
| Posting Market Center 400 @ 20.01 | |
| Posting Market Center 600 @ 20.00 | |
| Posting Market Center 200 @ 19.99 | |

Incoming Market Center-Restricted Sell Order

Figure 4:
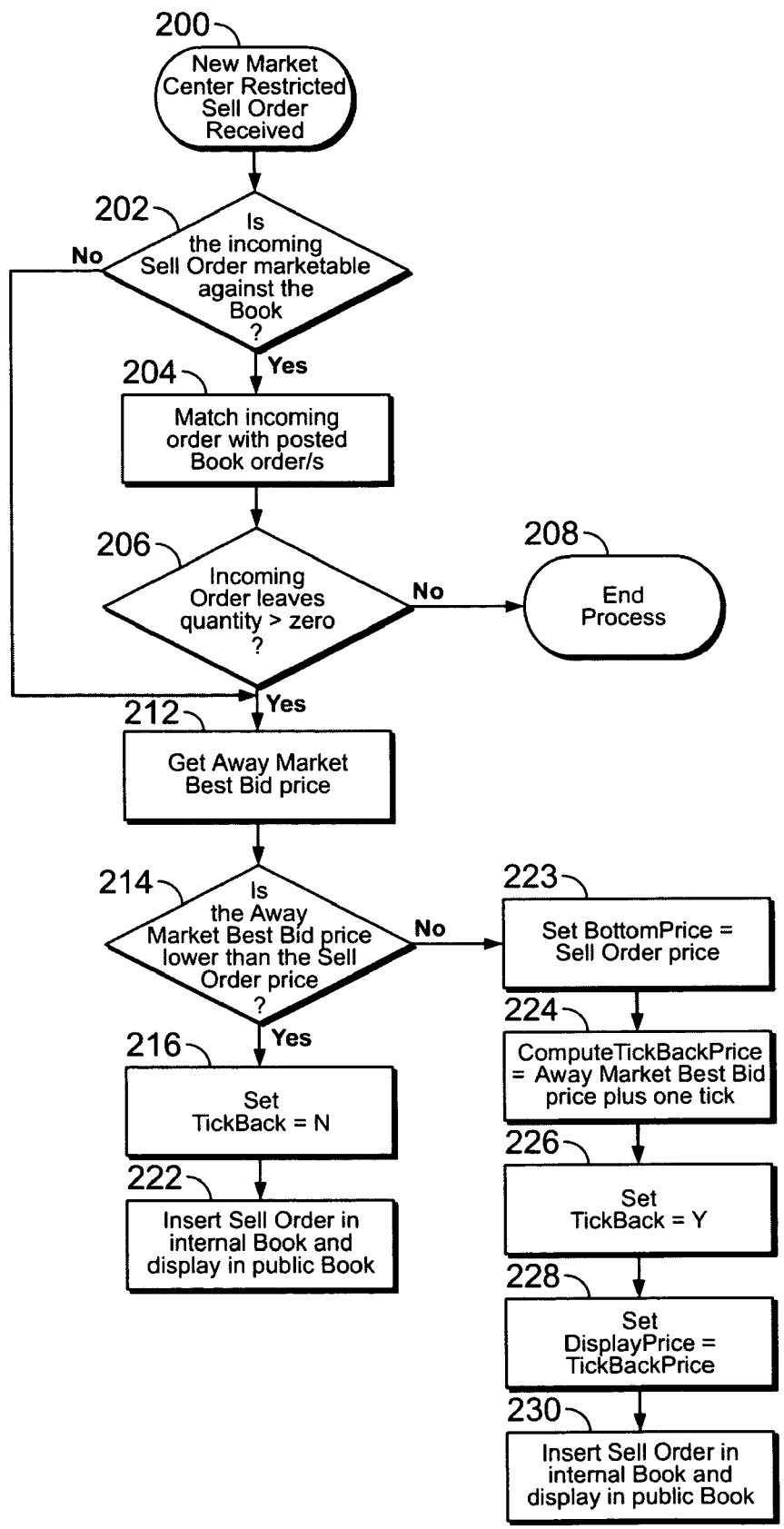
FIG. 4 is a flow diagram illustrating a process implemented by an embodiment of the present invention for incoming market center-restricted sell orders.

FIG. 4 illustrates the process implemented by the order maintenance program 22 where a trader 26 sends a sell order to the posting market center 20 with instructions that the sell order only be executed on the posting market center 20 (i.e. a market center-restricted sell order). At step 200, a new market center-restricted sell order is received by the order matching engine 21, and the order matching engine 21, recognizing the market center restriction, initiates the order maintenance program 22. At step 202, the process implemented by the order maintenance program 22 checks to see if the sell order is marketable against the posting market center's order book. If the sell order is marketable, the process proceeds to step 204 where the order matching engine 21 trades the new sell order against standing orders posted in the posting market center's order book according to the market center's trading rules. Then, at step 206, the process checks to see if the sell order still has any quantity remaining on the order to be traded. If the sell order does not, then the order is complete, and the process ends with respect to this order, as indicated at 208. If the order is not complete and still has quantity remaining to be traded, the process proceeds to step 212. Referring back to step 202, if the incoming sell order is not marketable, the process proceeds to step 212 at this point as well.

At step 212, the process retrieves the away market best bid price from data structure 25. At step 214, the away market best bid price is checked to see if it is lower than the sell order price. If the away market best bid price is lower than the sell order price, then the restricted sell order will not lock or cross the away market. The process proceeds to step 216 where a parameter, in this example named TickBack, is set to "N". Setting TickBack equal to "N" means that the process, as indicated at step 222, inserts the sell order in the posting market center's internal book and displays it on the public order book according to normal price/time priority rules for limit orders because the sell order does not lock or cross the away market.

Referring back to step 214, if the process determines that away market best bid price is not lower than the sell order price (i.e. the away market best bid price is equal to or greater than the sell order price), then the posting of this order on the posting market center 20 would lock or cross the away market. The process, in this instance, acts to protect the away market centers 24 while not canceling the order, as would have been done with prior systems. The process proceeds to step 223 where the process sets the "Bottom Price" parameter equal to the price set in the incoming sell order. The Bottom Price parameter sets the lowest possible price that the process will possibly set the order at when pegging it to the away market best bid price. Next, at step 224, the process computes a tick back price parameter ("Tick Back Price"). The tick back price parameter in this embodiment is equal to the away market best bid price plus one trade increment. At step 226, the process sets the tick back parameter ("Tick Back") to "Y" so the system knows for later checks that the order price has been ticked back. At step 228, the process sets a display price parameter ("Display Price") equal to the Tick Back Price parameter, and at step 230, the order is inserted into the posting market center's internal order book and displayed on the public order book according to the price/time priority rules applying to the Display Price parameter, not according to the order's original lower price (i.e. the Bottom Price).

EXAMPLE 4

Incoming Market Center-Restricted Sell Order
(Away Market Center at Best Bid Price)

An example of a new restricted sell order sent to a posting market center 20 is provided below. It should be understood that the order prices and market prices discussed in this example are by way of example only to illustrate how the process of an embodiment of the invention handles a market center-restricted sell order in a trading environment without a price exemption (i.e. in a trading environment where market best bids and best offers are respected such that orders on one market center are not allowed to trade through an away market center if the away market center is displaying the market best bid or market best offer).

In this example, the Market Best Bid is $19.95 and the Market Best Offer is $20.00. An Away Market Center A is quoting 300 @ $19.95 to 800 @ $20.00. The posting market center 20 has a limit buy order for 300 @ $19.94 in the market (Order Y). The posting market center internal book in this example appears as follows:

| Bids | Offers |
|---|---|
| Away Market Center A 300 @ 19.95 | Away Market Center A 800 @ 20.00 |
| Order Y: 300 @ 19.94 | |

The posting market center 20 receives the three incoming market center-restricted sell orders stated below in the following sequence and processes each order in accordance with the process of FIG. 4.

Order D: Sell 200 @ $19.96 (higher than the Market Best Bid price)

Order E: Sell 600 @ $19.95 (same as the Market Best Bid price)

Order F: Sell 700 @ $19.92 (lower than the Market Best Bid price)

Order D:

For Order D, the market center receives Order D at step 200. At step 202, the process assesses Order D's marketability against the posting market center's order book. In this case, Order D is not marketable because Order D is priced at $19.96, and this is higher than any bids presently posted on the posting market center 20. Accordingly, the process proceeds to step 212 where the process gets the away market best bid price from the data structure 25, which in this example is $19.95. At step 214, the process checks whether the away market best bid price is lower than Order D's sell order price. In this case, the away market best bid price ($19.95) is lower than Order D's restricted sell order price ($19.96), so the process continues on to step 216, setting the TickBack parameter to "N" since Order D's price does not need to be ticked back. At step 222, Order D is inserted into the posting market center's internal order book and is displayed on the public order book as an order to sell at $19.96.

Order E:

For Order E, the market center receives Order E at step 200. At step 202, the process assesses Order E's marketability against the posting market center's order book. In this case, as with Order D, Order E is not marketable. Even though Order E is priced at $19.95 and there is a bid in the market at $19.95, Order E is a restricted sell order and, as such, cannot execute against the bid at $19.95 on Away Market Center A. Accordingly, the process proceeds to step 212 where the process gets the away market best bid price of $19.95 in this example. At step 214, the process checks whether the away market best bid price is lower than Order E's sell order price. In this case, the away market best bid price ($19.95) is not lower than Order E's restricted sell order price ($19.95). They are equal. So, the process continues on to step 223, where the process sets the Bottom Price to $19.95 (i.e. Order E's sell order price). The process, then, at step 224, computes the tick back price parameter. In this example, the Tick Back Price parameter is $19.96 ($19.95+$0.01) (i.e. the away market best bid price plus one tick in this embodiment). At step 226, the process sets the Tick Back parameter to "Y" since Order E's price needs to be ticked back. At step 228, the process sets the Display Price parameter equal to the calculated Tick Back Price parameter. In this case, the Display Price parameter is set to $19.96. Then at step 230, Order E is inserted into the posting market center's internal order book, and the Display Price parameter of $19.96 is displayed on the public order book. However, the original price (i.e. the Bottom Price) of $19.95 is stored on the posting market center's internal book for reference for potential later re-pricing.

Order F:

For Order F, the market center receives Order F at step 200. At step 202, the process assesses Order F's marketability against the posting market center's order book. In this case, as with Orders D and E, Order F is not marketable. Accordingly, the process again proceeds to step 212 where the process gets the away market best bid price of $19.95. At step 214, the process checks whether the away market best bid price is lower than Order F's sell order price. In this case, the away market best bid price ($19.95) is not lower than Order F's restricted sell order price ($19.92). As such, the process continues on to step 223, where the process sets the Bottom Price to $19.92 (i.e. Order F's sell order price). The process, then, at step 224, computes the tick back price parameter. In this example, as with Order E, the Tick Back Price parameter is $19.96 ($19.95+$0.01) (i.e. the away market best bid price plus one tick). At step 226, the process sets the Tick Back parameter to "Y" since Order F's price needs to be ticked back. At step 228, the process sets the Display Price parameter equal to the calculated Tick Back Price parameter. In this case, the Display Price parameter is set to $19.96. Then at step 230, Order F is inserted into the posting market center's internal order book, and the Display Price parameter of $19.96 is displayed on the public order book. However, the original price (i.e. the Bottom Price) of $19.92 is stored on the posting market center's internal book for reference for potential later re-pricing.

After processing Orders D, E and F in this example, the posting market center posts them to its internal book according to price/time priority rules. In this example, the stored parameters appear as follows:

| Bids | Offers |
| --- | --- |
| Away Market Center A 300 @ 19.95 | Order D: 200 @ 19.96, TickBack = N ← |
| Order Y: 300 @ 19.94 | Order E: 600 @ 19.96, TickBack = Y ← BottomPrice = 19.95 |
| | Order F: 700 @ 19.96, TickBack = Y ← BottomPrice = 19.92 |
| | Away Market Center A 800 @ 20.00 |

In this example, at this point, the posting market center's best offer is 1500 @ $19.96 and the posting market center's best bid is 300 @ $19.94. The posting market center's public book looks like this:

| Bids | Offers |
| --- | --- |
| Posting Market Center 300 @ 19.94 | Posting Market Center 1500 @ 19.96 |

Figure 5:
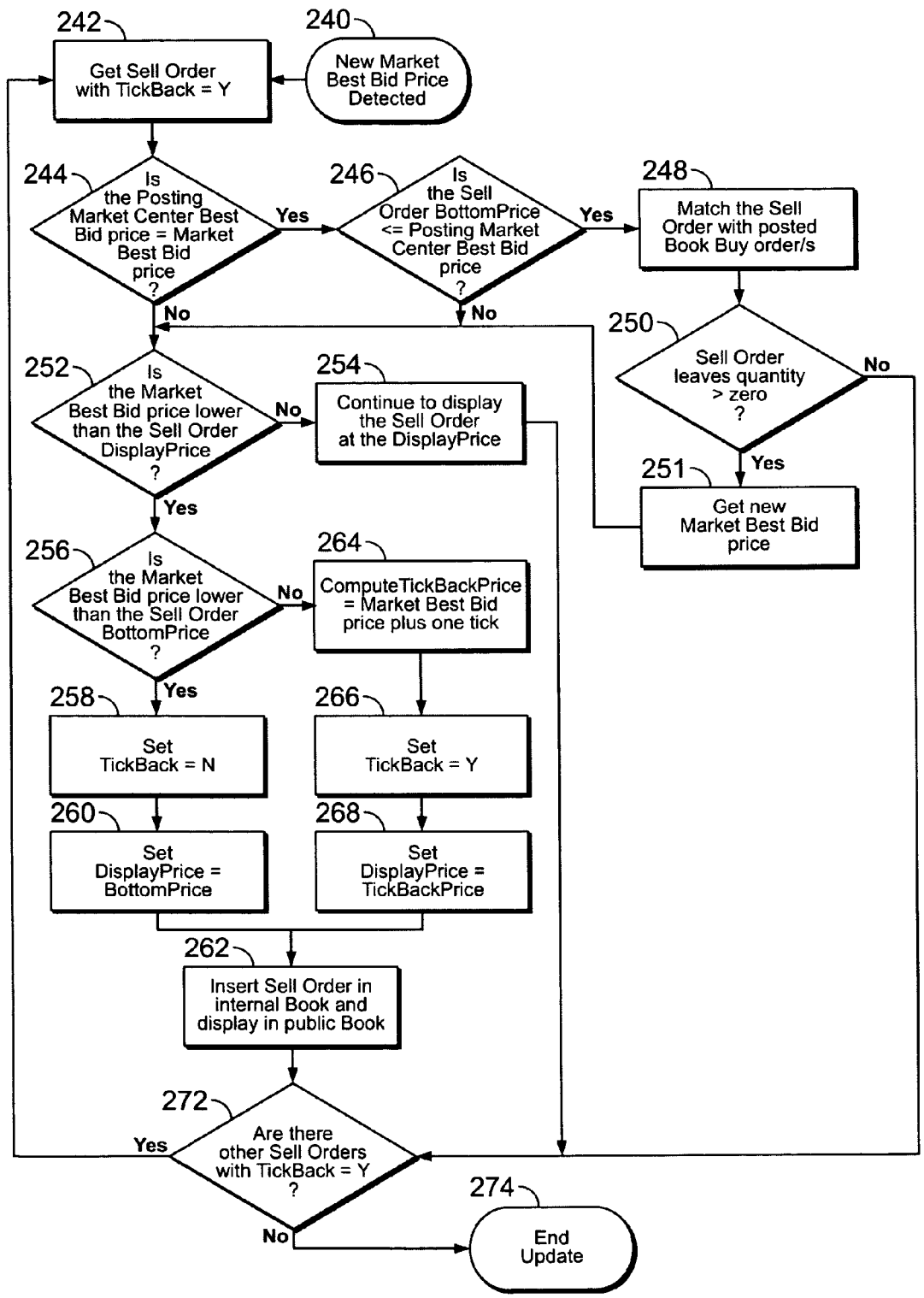
FIG. 5 is a flow diagram illustrating a process implemented by an embodiment of the present invention where ticked back buy orders are re-evaluated in view of an updated market best bid price.

Update of the Market Best Bid Price and Re-Evaluation of Ticked Back Market Center-Restricted Sell Orders Once the process has ticked back a market center-restricted sell order, such as Orders E and F in the example above, those orders must be checked and re-evaluated whenever the Market Best Bid price is updated. FIG. 5 illustrates the process implemented by the order maintenance program 22 where the Market Best Bid price is updated. The order matching engine 21 is continuously checking the best bid price for the entire market. At step 240, the order matching engine 21 detects a new Market Best Bid price and provides it to the order maintenance program 22. At step 242, the process implemented by the order maintenance program 22 retrieves a ticked back restricted sell order that has a "Tick Back" parameter equal to "Y". At step 244, the process checks if the posting market center's best bid price is equal to the Market Best Bid price (i.e. determining whether the posting market center 20 is at the Market Best Bid price). If the posting market center's best bid price is equal to the Market Best Bid price, then the process proceeds to step 246 where it checks whether the sell order's Bottom Price is less than or equal to the posting market center's best bid price. If the sell order's Bottom Price is less than or equal to the posting market center's best bid price, then at step 248, the process matches the sell order with the buy orders posted in the posting market center's book. Then, at step 250, the process checks to see if there is any quantity remaining on the sell order. If not, the process is complete for this order, and it checks to see if there are any further orders with a Tick Back parameter set to "Y", as indicated at step 272. If there is quantity remaining on the order, the process, at step 251, checks to see what the new Market Best Bid price is since the orders that put the posting market center 20 at the Market Best Bid price have now been exhausted. The process then proceeds to step 252. The process also proceeds to step 252 if the posting market center's price is not equal to the Market Best Bid price (step 244) or if the sell order's Bottom Price is greater than the posting market center's best bid price (step 246).

At step 252, the process checks if the updated Market Best Bid price is lower than the ticked back market center-restricted sell order's Display Price. If it is not, then, as indicated at step 254, the Display Price continues to be posted on the internal order book and displayed on the public order book. In this embodiment, the Display Price will continue to be displayed in the public order book even if in light of a new away market best bid price, the Away Market Center now crosses or locks the Display Price of the ticked back order on the posting market center 20. Once a market center-restricted sell order of the present invention is posted, it will stand its ground to later updates of the Market Best Bid price that move to or through the displayed price, even if it results in an Away Market Center price crossing or locking a ticked back order. As with a market center-restricted buy order described above, a market center-restricted sell order of the present invention differs from a traditional sell order that has been pegged to the bid in this regard. A traditional pegged sell order moves with the price on the Market Best Bid price in both directions, up and down, even if the price of the Market Best Bid price moves to or through the displayed price of the pegged sell order. A sell order pegged to the Bid does not stand its ground to a Market Best Bid price that moves to or through it, causing it to be re-priced less aggressively. This, as with the market center-restricted buy order, is in contrast to a market center-restricted sell order of the present invention, which does stand its ground to a Market Best Bid price that moves to or through its displayed price. From step 254, the process proceeds to step 272 where it checks to see if there are any other sell orders with the Tick Back parameter set to "Y".

Referring back to step 252, if the updated Market Best Bid price is lower than the ticked back market center-restricted sell order's Display Price, then the process proceeds to step 256 where the process checks to see if the updated Market Best Bid price is lower than the sell order's Bottom Price. If the updated Market Best Bid price is now lower than the sell order's Bottom Price, then the sell order's original price would no longer lock or cross the market if displayed. As such, at step 258, the TickBack parameter for this order is set to "N", and this order is no longer a pegged order. At step 260, the Display Price for this order is set to the Bottom Price, and at step 262, the order is inserted into the posting market center's internal order book and displayed on the public order book according to the price/time priority rules applying to the Display Price parameter, which is now equal to the Bottom Price.

Referring back to step 256, if the updated Market Best Bid price is not lower than the sell order's Bottom Price, then at step 264, similar to when the order was displayed initially, the process computes a Tick Back Price parameter. As when the order was initially processed, the Tick Back Price parameter in this embodiment is equal to the Market Best Bid price plus one tick. At step 266, the process sets the Tick Back parameter to "Y" again. At step 268, the process sets the Display Price parameter equal to the updated Tick Back Price parameter, and at step 262, the order is inserted into the posting market center's internal order book and the Display Price is displayed on the public order book according to the price/time priority rules applying to the Display Price parameter, not according to the order's original lower price (i.e. the Bottom Price).

At step 272, the process checks to see if there are other sell orders with the Tick Back parameter set to "Y". If there are, then the process goes back to step 242 and analyzes this order in the same manner it analyzed the previous sell order, as described above. The process continues in this manner until there are no further sell orders with a Tick Back parameter set to "Y" to update, at which point the update is complete as indicated at step 274.

Examples of situations where the away market best bid price has been updated are provided below. It should be understood that the order prices and market prices discussed in these examples are by way of example only to illustrate how the process of an embodiment of the invention handles updating a ticked back market center-restricted sell order.

EXAMPLE 5

Update of the Market Best Bid Price and Re-Evaluation of Ticked Back Market Center-Restricted Sell Orders (Away Market Best Bid Price Moves Higher; Display Price of Restricted Sell Orders Stand their Ground)

In this Example 5, following through from Example 4, the Market Best Bid price has moved higher and has changed from $19.95 to $19.97. Away Market Center A is now quoting 500 @ $19.97 to 800 @ $20. Carrying through from Example 4 above, in the moment before processing and reevaluating the ticked back orders, the posting market center internal book appears as follows:

| Bids | Offers |
|---|---|
| Away Market Center A 500 @ 19.97 | Order D: 200 @ 19.96, TickBack = N ← |
| Order Y: 300 @ 19.94 | Order E: 600 @ 19.96, TickBack = Y ← BottomPrice = 19.95 |
| | Order F: 700 @ 19.96, TickBack = Y ← BottomPrice = 19.92 |
| | Away Market Center A 800 @ 20.00 |

Orders E and F, since their Tick Back parameters are set to "Y", are processed in accordance with the process of FIG. 5 in light of the updated Market Best Bid price. Due to the similarity of processing in this example, Orders E and F are discussed together, but it should be understood that according to the price/time priority rules in effect that Order E is actually processed first. At step 242, the process retrieves the order to be analyzed (i.e. in this example, Order E first and then Order F). At step 244, the process checks to see if the updated posting market center's best bid price is equal to the Market Best Bid price. In this example, it is not. The process moves on to step 252 where the process determines whether the updated Market Best Bid price is lower than the orders' Display Price. In this example, the updated Market Best Bid price is not lower than Order E and F's Display Price. Away Market Center A's bid price is now higher than Order E and F's Display Price ($19.97>$19.96). Therefore, as step 254 indicates, the Display Price for Orders E and F does not change, and is not re-priced. Since there are no further ticked back orders with a Tick Back parameter set to "Y", the update is complete.

Orders D, E and F stand their ground even though Away Market Center A has now crossed the posting market center's order book. In fact, because Orders D, E and F stand their ground, Away Market Center A, according to general marketplace rules applicable in this embodiment of the invention, is required to route an obligation to buy 1500 shares at $19.96 to the posting market center 20, the displayed size and price on the posting market center 20. Upon receipt, the posting market center 20 processes this obligation to trade with Orders D, E and F in the same manner it processes all other incoming away market trading obligations, by filling Orders D, E and F. If Away Market Center A does not satisfy its obligation to trade fully against Orders D, E and F, then the posting market center 20 follows its normal procedure of routing a request for satisfaction to Away Market Center A for any shares not filled.

EXAMPLE 6

Update of the Market Best Bid Price and Re-evaluation of Ticked Back Market Center-Restricted Sell Orders (Posting Market Center at the Market Best Bid)

In this Example 6, following through from Example 4, the Market Best Bid price has moved lower and has changed from $19.95 to $19.94. The posting market center 20 now has the Market Best Bid (Order Y), and Away Market Center A is now quoting 400 @ $19.93 to 800 @ $20. Carrying through from Example 4 above, the posting market center internal book in the moment before processing and reevaluating the ticked back orders appears as follows:

| Bids | Offers |
|---|---|
| Order Y: 300 @ 19.94 | Order D: 200 @ 19.96, TickBack = N ← |
| Away Market Center A 400 | Order E: 600 @ 19.96, TickBack = Y ← |
| @ 19.93 | BottomPrice = 19.95 |
|  | Order F: 700 @ 19.96, TickBack = Y ← |
|  | BottomPrice = 19.92 |
|  | Away Market Center A 800 @ 20 |

Orders E and F, since their Tick Back parameters are set to "Y", are processed in accordance with the process of FIG. 5 in light of the updated Market Best Bid price. In this embodiment, Order E is processed first based on price/time priority rules. At step 240, the market center 20 detects a new Market Best Bid price. At step 242, the process retrieves Order E, since Order E has a Tick Back parameter set to "Y". At step 244, the process checks to see if the posting market center's best bid price is equal to the Market Best Bid price. In this example, it is. The process moves on to step 246 where the process determines whether the sell order Bottom Price is less than or equal to the posting market center's best bid price. Order E's Bottom Price ($19.95), in this example, is greater than the posting market center's best bid price ($19.94), so the process proceeds to step 252. At step 252, the process determines whether the Market Best Bid price is lower than Order E's Display Price. In this example, the new Market Best Bid price ($19.94) is lower than Order E's Display Price ($19.96). The process proceeds to step 256 where it determines whether the Market Best Bid price is lower than Order E's Bottom Price. In this example, the new Market Best Bid price ($19.94) is lower than Order E's Bottom Price ($19.95). As such, at step 258, the process sets the Tick Back parameter to "N", and at step 260 Order E's Display Price is set to its Bottom Price since the new Market Best Bid is now lower than Order E's Bottom Price. Order E's Display Price is now set to Order E's original buy price of $19.95. Order E is no longer ticked back and will not be re-priced again. At step 262, the order is inserted into the posting market center's internal order book and displayed on the public order book according to the price time/priority rules applying to the new Display Price parameter, which is now Order E's original price. At step 272, the process checks for other Buy Orders that are ticked back. In this case, it finds Order F.

At step 242, the process retrieves Order F, since Order F has a Tick Back parameter set to "Y" and is next to be processed according to the price/time priority rules applicable in this example. The process then, at step 244, as before, determines whether the posting market center's best bid price is equal to the Market Best Bid price. In this example, it still is. Therefore, the process proceeds to step 246 where it determines whether the Order F's Bottom Price is less than or equal to the posting market center's best bid price. Order F's Bottom Price ($19.92), in this example, is less than the posting market center's best bid price ($19.94), so the process proceeds to step 248 where the process matches Order F against buy orders posted on the posting market center 20. In this example, 300 shares of Order F execute against Order Y. At step 250, the process checks to see if Order F has any quantity remaining. In this instance, Order F does. It has 400 shares remaining. The process proceeds to step 251 where it gets the new Market Best Bid price. In this example, the new Market Best Bid price is $19.93 (i.e. the bid of 400 @ 19.93 on Away Market Center A). The process then proceeds to step 252.

At step 252, the process determines whether the Market Best Bid price is lower than Order F's Display Price. In this example, the new Market Best Bid price ($19.93) is lower than Order F's Display Price ($19.96). The process proceeds to step 256 where it determines whether the Market Best Bid price is lower than Order F's Bottom Price. In this example, the new Market Best Bid price ($19.93) is not lower than Order F's Bottom Price ($19.92). As such, at step 264, the process computes an updated tick back price parameter. In this example, the Tick Back Price parameter is $19.94 ($19.93+$0.01) (i.e. the away market best bid price plus one tick). At step 266, the process sets the Tick Back parameter to "Y" since Order F's price still needs to be ticked back. At step 268, the process sets the Display Price parameter equal to the calculated Tick Back Price parameter. In this case, the Display Price parameter is set to $19.94. Then at step 262, Order F is inserted into the posting market center's internal order book, and the Display Price parameter of $19.94 is displayed on the public order book. However, the original price (i.e. the Bottom Price) of $19.92 is still stored on the posting market center's internal book for reference for potential later re-pricing.

At step 272, the process checks to see if there are other sell orders with the Tick Back parameter set to "Y". There are no more in this example. So, the update is complete, as indicated at step 274.

After processing Orders E and F as explained above, the posting market center posts them to its internal book according to price/time priority rules. In this example, the stored parameters appear as follows:

| Bids | Offers |
|---|---|
| Away Market Center A 400 | Order F: 400 @ 19.94, TickBack = Y ← |
| @ 19.93 | BottomPrice = 19.92 |
|  | Order E: 600 @ 19.95, TickBack = N ← |
|  | BottomPrice = 19.95 |
|  | Order D: 200 @ 19.96, TickBack = N ← |
|  | Away Market Center A 800 @ 20 |

In this example, at this point, the posting market center's public book looks like this:

| Bids | Offers |
|---|---|
|  | Posting Market Center 400 @ 19.94 |
|  | Posting Market Center 600 @ 19.95 |
|  | Posting Market Center 200 @ 19.96 |

While the invention has been discussed in terms of certain embodiments, it should be appreciated that the invention is not so limited. The embodiments are explained herein by way of example, and there are numerous modifications, variations and other embodiments that may be employed that would still be within the scope of the present invention.

What is claimed is:

1. A method comprising:
   (a) providing a posting market center that uses a computing system having a public order book and a tick back increment;
   (b) receiving by the computing system a market center-restricted order specifying a financial instrument and a price;
   (c) retrieving by the computing system an away market best price in the specified financial instrument;

(d) determining by the computing system whether the price of the market center-restricted order locks or crosses the away market best price;
(e) responsive to determining that the price of the market center-restricted order locks or crosses the away market best price:
   computing by the computing system a ticked back price parameter based on the away market best price and the tick back increment; and
   displaying by the computing system the computed ticked back price parameter as the market center-restricted order price on the posting market center public order book;
(f) retrieving by the computing system an updated away market best price;
(g) determining by the computing system whether the updated away market best price locks or crosses the posting market center public order book based on the price displayed for the market center-restricted order;
(h) responsive to determining that the updated away market best price locks or crosses the posting market center public order book:
   maintaining by the computing system the price displayed for the market center-restricted order in the posting market center public order book; and
(i) responsive to determining that the updated away market best price does not lock or cross the posting market center public order book:
   determining by the computing system whether the posting market center has at least one contra-order having a contra-order price at the market best offer price, if the market center-restricted order is a bid, or at the market best bid price, if the market center-restricted order is an offer, and whether the financial instrument's price is greater than or equal to the contra-order price, if the market center-restricted order is a bid, or, whether the financial instrument's price is less than or equal to the contra-order price, if the market center-restricted order is an offer; and
   responsive to determining that the posting market center has at least one contra-order having a contra-order price at the market best offer price, if the market center-restricted order is a bid, or at the market best bid price, if the market center-restricted order is an offer, and that the financial instrument's price is greater than or equal to the contra-order price, if the market center-restricted order is a bid, or, the financial instrument's price is less than or equal to the contra-order price, if the market center-restricted order is an offer:
      trading by the computing system the market center-restricted order against the one or more contra-orders at the contra-order price.

2. The method of claim 1, wherein after receiving the market center-restricted order, further comprising determining by the computing system the marketability of the order against the posting market center internal book.

3. The method of claim 1, wherein the computing system is one or more programmed computers.

4. The method of claim 1, wherein the computing system is distributed over several physical locations.

5. The method of claim 1, wherein the tick back increment is the minimum amount the financial instrument's price can change.

6. The method of claim 1, wherein the tick back increment equals $0.01.

7. A method comprising:
(a) providing a posting market center that uses a computing system having an internal order book, a public order book, and a tick back increment;
(b) receiving by the computing system a market center-restricted buy order specifying a financial instrument and a price;
(c) retrieving by the computing system an away market best offer price in the specified financial instrument;
(d) determining by the computing system whether the away market best offer price is higher than the price of the market center-restricted buy order;
(e) responsive to determining whether the away market best offer price is not higher than the price of the market center-restricted buy order, creating a ticked back buy order by:
   setting by the computing system the price of the market center-restricted buy order as a top price parameter and storing the top price parameter;
   computing by the computing system a ticked back price parameter equal to the away market best offer price minus the tick back increment and setting and storing the computed ticked back price parameter as a display price parameter;
   inserting by the computing system the stored display price parameter and the stored top price parameter of the ticked back buy order in the posting market center internal order book; and
   displaying by the computing system the stored display price parameter on the posting market center public order book;
(f) responsive to determining that the away market best offer price is higher than the price of the market restricted buy order:
   inserting by the computing system the market restricted buy order into the posting market center internal order book; and
   displaying by the computing system the marketing restricted buy order on the posting market center public order book at the buy order price;
(g) retrieving by the computing system an updated away market best offer price;
(h) determining by the computing system whether the updated away market best offer price has moved lower to be the same as or less than the price displayed for the market center-restricted buy order; and
(i) responsive to determining that the updated away market best offer price has moved lower to be the same as or less than the price displayed for the market center-restricted buy order:
   maintaining by the computing system the price displayed for the market center-restricted buy order in the posting market center public order book
(j) providing by the computing system at least one sell order at a posting market center best offer price;
(k) receiving by the computing system a second updated market best offer price;
(l) retrieving by the computing system a ticked back buy order;
(m) determining by the computing system whether the posting market center best offer price is equal to the second updated market best offer price; and
(n) responsive to determining that the posting market center best offer price is equal to the second updated market best offer price:

determining by the computing system whether the stored top price parameter is greater than or equal to the posting market center best offer price; and trading by the computing system the ticked back order against the sell order at the posting market center best offer price, if the stored top price parameter is greater than or equal to the posting market center best offer price.

8. The method of claim 7, wherein after receiving by the computing system the market center-restricted buy order, further comprising determining by the computing system the marketability of the buy order against the posting market center internal book.

9. The method of claim 7, further comprising:

determining by the computing system whether the updated market best offer price is higher than the display price parameter of the ticked back buy order after determining by the computing system whether the posting market center best offer price is equal to the updated market best offer price, wherein when the updated market best offer price is not higher than the display price parameter of the ticked back buy order, continuing to display by the computing system the display price parameter of the ticked back buy order on the posting market center public order book.

10. The method of claim 7, further comprising:

determining by the computing system whether the updated market best offer price is higher than the display price parameter of the ticked back buy order, wherein when the updated market best offer price is higher than the display price parameter of the ticked back buy order, determining by the computing system whether the updated market best offer price is higher than the top price parameter of the ticked back buy order.

11. The method of claim 10, wherein when the updated away market best offer price is higher than the top price parameter of the ticked back buy order, the ticked back buy order is no longer ticked back and the top price parameter is now displayed by the computing system on the posting market center public order book as the buy order price.

12. The method of claim 10, wherein when the updated away market best offer price is not higher than the top price parameter of the ticked back buy order:

computing by the computing system an updated tick back price equal to the updated market best offer price minus the tick back increment and setting and storing the updated tick back price as an updated display price parameter;

inserting by the computing system the updated display price parameter into the internal order book; and displaying by the computing system the updated display price parameter on the posting market center public order book.

13. The method of claim 7, further comprising:

wherein when the updated market best offer price is not higher than the display price parameter of the ticked back buy order, continuing to display by the computing system the display price parameter of the ticked back buy order on the posting market center public order book.

14. The method of claim 7, wherein the computing system is one or more programmed computers.

15. The method of claim 7, wherein the computing system is distributed over several physical locations.

16. A method comprising:

(a) providing a posting market center that uses a computing system having an internal order book, a public order book, and a tick back increment;

(b) receiving by the computing system a market center-restricted sell order specifying a financial instrument and a price;

(c) retrieving by the computing system an away market best bid price in the specified financial instrument; and (d) determining by the computing system whether the away market best bid price is lower than the price of the market center-restricted sell order;

(e) responsive to determining whether the away market best bid price is not lower than the price of the market center-restricted sell order, creating a ticked back sell order by:

setting by the computing system the price of the market center-restricted sell order as a bottom price parameter and storing the bottom price parameter;

computing by the computing system a ticked back price parameter equal to the away market best bid price plus the tick back increment and setting and storing the computed ticked back price parameter as a display price parameter;

inserting by the computing system the stored display price parameter and the stored bottom price parameter of the ticked back sell order in the posting market center internal order book; and displaying by the computing system the stored display price parameter on the posting market center public order book;

(f) retrieving by the computing system an updated away market best bid price;

(g) determining by the computing system whether the updated away market best bid price has moved higher to be the same as or greater than the price displayed for the market center-restricted sell order;

(h) determining by the computing system whether the updated away market best bid price has moved higher to be the same as or greater than the price displayed for the market center-restricted sell order; and (i) responsive to determining that the updated away market best bid price has moved higher to be the same as or greater than the price displayed for the market center-restricted sell order:

maintaining by the computing system the price displayed for the market center-restricted sell order in the posting market center public order book.

17. The method of claim 16, wherein an away market center is posting the updated away market best bid price, further comprising creating an obligation for the away market center to trade against the market center-restricted sell order.

18. The method of claim 16, wherein when the away market best bid price is lower than the price of the market restricted sell order, the market restricted sell order is inserted by the computing system into the posting market center internal order book and is displayed by the computing system on the posting market center public order book at the sell order price.

19. The method of claim 16, wherein after receiving the market center-restricted sell order, further comprising determining by the computing system the marketability of the sell order against the posting market center internal book.

20. The method of claim 16, further comprising:

providing at least one buy order at a posting market center best bid price;

receiving by the computing system an updated market best bid price;

retrieving by the computing system a ticked back sell order;

determining by the computing system whether the posting market center best bid price is equal to the updated market best bid price, wherein when the posting market center best bid price is equal to the updated market best bid price:

determining by the computing system whether the stored bottom price parameter is less than or equal to the posting market center best bid price; and where the stored bottom price parameter is less than or equal to the posting market center best bid price, trading by the computing system the ticked back order against the buy order at the posting market center best bid price.

21. The method of claim 20, further comprising:

determining by the computing system whether the updated market best bid price is lower than the display price parameter of the ticked back sell order after determining whether the posting market center best bid price is equal to the updated market best bid price, wherein when the updated market best bid price is not lower than the display price parameter of the ticked back sell order, continuing to display by the computing system the display price parameter of the ticked back sell order on the posting market center public order book.

22. The method of claim 20, further comprising:

determining by the computing system whether the updated market best bid price is lower than the display price parameter of the ticked back sell order, wherein when the updated market best bid price is lower than the display price parameter of the ticked back sell order, determining by the computing system whether the updated market best bid price is lower than the bottom price parameter of the ticked back sell order.

23. The method of claim 22, wherein when the updated away market best bid price is lower than the bottom price parameter of the ticked back sell order, the ticked back sell order is no longer ticked back and the bottom price parameter is now displayed by the computing system on the posting market center public order book as the sell order price.

24. The method of claim 22, wherein when the updated away market best bid price is not lower than the bottom price parameter of the ticked back sell order:

computing by the computing system an updated tick back price equal to the updated market best bid price plus the tick back increment and setting and storing the updated tick back price as an updated display price parameter;

inserting by the computing system the updated display price parameter into the posting market center internal order book; and displaying by the computing system the updated display price parameter on the posting market center public order book.

25. The method of claim 16, further comprising:

receiving by the computing system an updated market best bid price;

retrieving by the computing system a ticked back sell order;

determining by whether the updated market best bid price is lower than the display price parameter of the ticked back sell order, wherein when the updated market best bid price is not lower than the display price parameter of the ticked back sell order, continuing to display by the computing system the display price parameter of the ticked back sell order on the posting market center public order book.

26. The method of claim 16, wherein the computing system is one or more programmed computers.

27. The method of claim 16, wherein the computing system is distributed over several physical locations.

28. A posting market center, comprising: an internal order book and a public order book;

an interface for receiving orders, including market center-restricted orders specifying a financial instrument and a price;

means for determining an away market best price in a specified financial instrument and for determining an updated best away market price;

a posting market center memory for storing code for analyzing and processing market center-restricted orders and storing a tick back increment;

a processor for interacting with the interface and executing the stored code for analyzing and processing market center-restricted orders when the interface receives a market center-restricted order, wherein the code, when executed:

retrieves an away market best price in the specified financial instrument;

determines whether the price of the market center-restricted order locks or crosses the best away market price;

responsive to determining whether that the price of the market center-restricted order locks or crosses the away market best price:

computes a ticked back price parameter based on the away market best price and the tick back increment; and displays the computed ticked back price parameter as the market center-restricted order price on the posting market center public order book;

retrieves an updated away market best price;

determines whether the updated away market best price locks or crosses the posting market center public order book based on the price displayed for the market center-restricted order;

responsive to determining that the updated away market best price locks or crosses the posting market center public order book:

maintains the price displayed for the market center-restricted order in the posting market center public order book; and responsive to determining that the updated away market best price does not lock or cross the posting market center public order book:

determines whether the posting market center has at least one contra-order having a contra-order price at the market best offer price, if the market center-restricted order is a bid, or at the market best bid price, if the market center-restricted order is an offer, and whether the financial instrument's price is greater than or equal to the contra-order price, if the market center-restricted order is a bid, or, whether the financial instrument's price is less than or equal to the contra-order price, if the market center-restricted order is an offer:

responsive to determining that the posting market center has at least one contra-order having a contra-order price at the market best offer price, if the market center-restricted order is a bid, or at the market best bid price, if the market center-restricted order is an offer, and that the financial instrument's price is greater than or equal to the contra-order price, if the market center-restricted order is a bid, or, the financial instrument's price is less than or equal to the contra-order price, if the market center-restricted order is an offer:

trades the market center-restricted order against the one or more contra-orders at the contra-order price.

29. The posting market center of claim 28, wherein after receiving the market center-restricted order, the code, when executed, further determines the marketability of the order against the posting market center internal book.

30. A posting market center comprising:

a computing system including at least one processor for executing code stored in at least one memory, wherein the code when executed:

(a) provides a posting market center having a public order book and a tick back increment;

(b) receives a market center-restricted order specifying a financial instrument and a price;

(c) retrieves an away market best price in the specified financial instrument;

(d) determines whether the price of the market center-restricted order locks or crosses the away market best price;

(e) responsive to determining that the price of the market center-restricted order locks or crosses the away market best price:

computes a ticked back price parameter based on the away market best price and the tick back increment; and displays the computed ticked back price parameter as the market center-restricted order price on the posting market center public order book;

(f) retrieves an updated away market best price;

(g) determines whether the updated away market best price locks or crosses the posting market center public order book based on the price displayed for the market center-restricted order;

(h) responsive to determining that the updated away market best price locks or crosses the posting market center public order book:

maintains the price displayed for the market center-restricted order in the posting market center public order book; and (i) responsive to determining that the updated away market best price does not lock or cross the posting market center public order book:

determines whether the posting market center has at least one contra-order having a contra-order price at the market best offer price, if the market center-restricted order is a bid, or at the market best bid price, if the market center-restricted order is an offer, and whether the financial instrument's price is greater than or equal to the contra-order price, if the market center-restricted order is a bid, or, whether the financial instrument's price is less than or equal to the contra-order price, if the market center-restricted order is an offer;

responsive to determining that the posting market center has at least one contra-order having a contra-order price at the market best offer price, if the market center-restricted order is a bid, or at the market best bid price, if the market center-restricted order is an offer, and that the financial instrument's price is greater than or equal to the contra-order price, if the market center-restricted order is a bid, or, the financial instrument's price is less than or equal to the contra-order price, if the market center-restricted order is an offer:

trades by the computing system the market center-restricted order against the one or more contra-orders at the contra-order price.

31. The posting market center of claim 30, wherein the computing system is one or more programmed computers.

32. The posting market center of claim 30, wherein the computing system is distributed over several physical locations.

* * * * *